US009952805B2

(12) United States Patent
Nagao et al.

(10) Patent No.: US 9,952,805 B2
(45) Date of Patent: Apr. 24, 2018

(54) STORAGE SYSTEM AND DATA WRITE METHOD USING A LOGICAL VOLUME TO EITHER STORE DATA SUCCESSFULLY ONTO A FIRST MEMORY OR SEND A FAILURE RESPONSE TO A SERVER COMPUTER IF THE STORAGE ATTEMPT FAILS

(71) Applicant: HITACHI, LTD., Tokyo (JP)

(72) Inventors: Takashi Nagao, Tokyo (JP); Tomohiro Kawaguchi, Tokyo (JP); Yoshinori Oohira, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 15/119,860

(22) PCT Filed: Sep. 11, 2014

(86) PCT No.: PCT/JP2014/074094
§ 371 (c)(1),
(2) Date: Aug. 18, 2016

(87) PCT Pub. No.: WO2016/038722
PCT Pub. Date: Mar. 17, 2016

(65) Prior Publication Data
US 2017/0060478 A1    Mar. 2, 2017

(51) Int. Cl.
*G06F 13/00* (2006.01)
*G06F 3/06* (2006.01)
(Continued)

(52) U.S. Cl.
CPC .............. *G06F 3/0659* (2013.01); *G06F 3/06* (2013.01); *G06F 3/0604* (2013.01); *G06F 3/067* (2013.01);
(Continued)

(58) Field of Classification Search
CPC ...... G06F 3/0659; G06F 3/067; G06F 3/0604; G06F 3/06; G06F 11/008; G06F 11/2069; G06F 11/2082; G06F 11/3051
(Continued)

(56) References Cited

U.S. PATENT DOCUMENTS

2005/0246487 A1    11/2005  Ergan et al.
2007/0300013 A1    12/2007  Kitamura
(Continued)

FOREIGN PATENT DOCUMENTS

JP    2000-347909 A    12/2000
JP    2006-004407 A    1/2006
(Continued)

*Primary Examiner* — Hong Kim
(74) *Attorney, Agent, or Firm* — Volpe and Koenig, P.C.

(57) ABSTRACT

A processor receives a command from a server computer to designate a plurality of addresses related to a plurality of logical storage areas, and write a plurality of write data to the logical storage areas. The processor receives the write data and writes it to storage areas different from storage areas in which a plurality of holding data are stored in a first memory. When the processor determines that the write data are written to the first memory, the processor transmits a success response to a host computer. When the write data satisfy a predetermined condition, the processor writes the write data in the first memory to a plurality of first device storage areas. When it is determined that at least a part of the data is not written to the first memory, the processor transmits a failure response to the host computer.

14 Claims, 15 Drawing Sheets

(51) Int. Cl.
   *G06F 11/20* (2006.01)
   *G06F 11/30* (2006.01)
   *G06F 11/00* (2006.01)
(52) U.S. Cl.
   CPC ........ *G06F 11/008* (2013.01); *G06F 11/2069* (2013.01); *G06F 11/2082* (2013.01); *G06F 11/3051* (2013.01)
(58) Field of Classification Search
   USPC ............... 711/154, 111, 156, 166; 714/1
   See application file for complete search history.

(56) References Cited

U.S. PATENT DOCUMENTS

| | | |
|---|---|---|
| 2008/0320245 A1 | 12/2008 | Tomlin et al. |
| 2010/0161936 A1 | 6/2010 | Royer et al. |
| 2012/0278559 A1 | 11/2012 | Hutchison et al. |
| 2013/0166855 A1 | 6/2013 | Batwara |
| 2013/0297972 A1* | 11/2013 | Yokote .................. G06F 11/008 714/15 |
| 2014/0082311 A1* | 3/2014 | McNeeney ........... G06F 11/141 711/162 |
| 2015/0370656 A1* | 12/2015 | Tsafrir ................ G06F 11/1088 714/6.3 |

FOREIGN PATENT DOCUMENTS

| | | |
|---|---|---|
| JP | 2008-004090 A | 1/2008 |
| JP | 2009-282752 A | 12/2009 |
| JP | 2012-507097 A | 3/2012 |
| JP | 2012-508428 A | 4/2012 |
| WO | 2008/156682 A1 | 12/2008 |

\* cited by examiner

Volume management table 14

| Volume ID | Address | Drive ID | Physical address |
|---|---|---|---|
| 0 | 1024 | 1 | 1234 |
| 0 | 1025 | 2 | 1234 |
| 1 | 512 | 1 | 1111 |
| ... | ... | ... | ... |

Fig. 2

Cache management table 19

| Volume ID | Address | Cache address | Exclusion flag |
|---|---|---|---|
| 0 | 1024 | 128 | ON |
| 0 | 1025 | 256 | OFF |
| ... | ... | ... | ... |
| 1 | 512 | 1024 | OFF |
| ... | ... | ... | ... |

Fig. 3

Temporary area management table 30

| Temporary area address 31 | Volume ID 32 | Address 33 | Command ID 34 |
|---|---|---|---|
| 1000 | 0 | 1024 | 1 |
| 1001 | N/A | N/A | N/A |
| 1002 | 0 | 1025 | 1 |
| 1003 | 1 | 512 | 2 |
| ... | ... | ... | ... |

| Cache management table | | | | |
|---|---|---|---|---|
| Volume ID | Address | Cache address | Exclusion flag | Restoration flag |
| 0 | 1024 | 128 | ON | OFF |
|   | 1025 | N/A | OFF | ON |
| ... | ... | ... | ... | ... |
| 1 | 512 | 1024 | OFF | OFF |
| ... | ... | ... | ... | ... |

26

Journal

| Volume ID | Address | Size | Command ID | Entry number |
|---|---|---|---|---|
| 261 | 263 | 265 | 267 | 269 |
| 0 | 1234 | 512 | 1 | 2 |
| 0 | 2222 | 4096 | 1 | 2 |
| 1 | 1111 | 1024 | 2 | 1 |
| 0 | 1111 | 512 | 3 | 1 |
| ... | ... | ... | ... | ... |

STORAGE SYSTEM AND DATA WRITE METHOD USING A LOGICAL VOLUME TO EITHER STORE DATA SUCCESSFULLY ONTO A FIRST MEMORY OR SEND A FAILURE RESPONSE TO A SERVER COMPUTER IF THE STORAGE ATTEMPT FAILS

TECHNICAL FIELD

The present invention relates to a storage system.

BACKGROUND ART

A scatter write atomic (SWA) command is known. The SWA command is a small computer system interface (SCSI) command in standardization activity. The SWA command is transmitted to a transmission destination together with a parameter list. The parameter list is obtained by listing data, a data length of the data, and a head address of a storage area of a write destination of the data, for a plurality of data in a dependency relation to be write targets.

SUMMARY OF INVENTION

Technical Problem

However, a storage apparatus according to the related art does not correspond to the SWA command. When it assumed that the storage apparatus receives the SWA command, the storage apparatus writes all of data designated by the parameter list to designed storage areas and transmits a normal end response to a transmission source of the SWA command. However, when a write process of the plurality of data based on the SWA command ends due to occurrence of an obstacle before the normal end response is transmitted after the SWA command is received, a storage system cannot ensure maintenance of a state of any one of a state before write and a state after the write, that is, maintenance of consistency of the plurality of data, for all of the data.

Solution to Problem

In order to solve the above described problem, a storage system according to the present invention includes: a first storage device; a first processor coupled to a server computer and the first storage device; and a first memory coupled to the first processor. The first processor provides a first logical volume to the server computer, on the basis of the first storage device. The first memory stores first volume information showing an association of a plurality of logical storage areas in the first logical volume and a plurality of first device storage areas in the first storage device. The first storage device stores a plurality of holding data in the plurality of first device storage areas. The first memory stores the plurality of holding data, when the first processor receives a command to indicate designating a plurality of addresses showing the plurality of logical storage areas, respectively, and writing a plurality of write data to the plurality of logical storage areas, respectively, from the server computer. The first processor executes a data reception process for receiving the plurality of write data based on the command from the server computer and writing the plurality of write data to storage areas different from storage areas in which the plurality of holding data are stored in the first memory. The first processor determines whether all of the plurality of write data are written to the first memory, when it is determined that all of the plurality of write data are written to the first memory. The first processor transmits a first success response to the host computer, when the plurality of write data satisfies a predetermined condition. The first processor writes the plurality of write data in the first memory to the plurality of first device storage areas, respectively. When it is determined that at least a part of the plurality of data is not written to the first memory, the first processor transmits a first failure response to the host computer.

Advantageous Effects of Invention

According to the present invention, consistency of data can be maintained for a plurality of data based on a SWA command.

BRIEF DESCRIPTION OF DRAWINGS

FIG. 2 illustrates an example of a volume management table 14.

FIG. 3 illustrates an example of a cache management table 19.

BEST MODE FOR CARRYING OUT THE INVENTION

Figure 1:
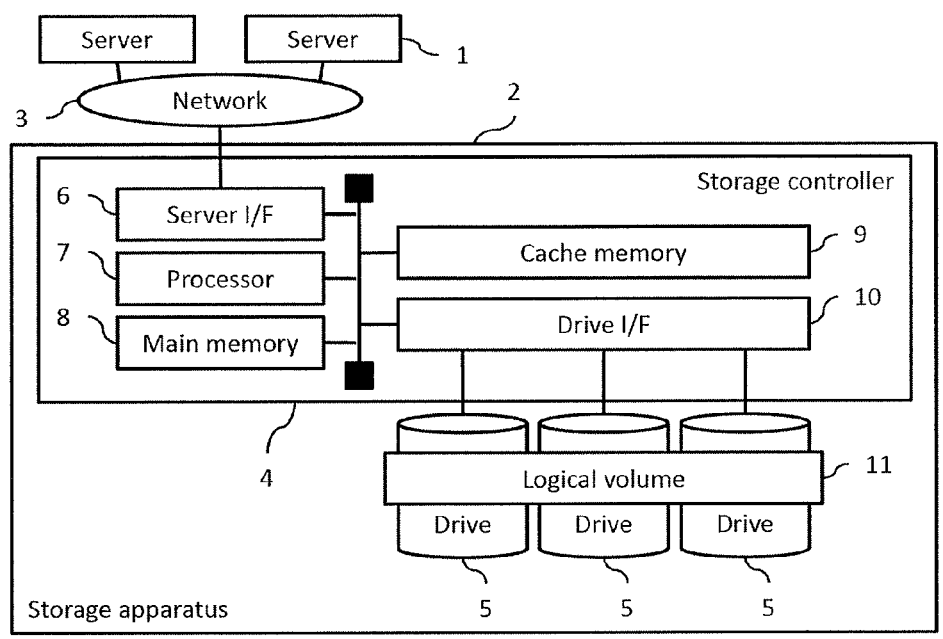
FIG. 1 is a configuration diagram of a computer system according to a first embodiment.

In the following description, information may be described using an expression of a "kkk table". However, the information may be expressed by a data structure other than the table. The "kkk table" can be called "kkk information" to show not depending on the data structure.

In addition, in the following description, a process may be described using a "program" as a subject. However, the program is executed by a processor to execute a prescribed process while appropriately using a storage resource (for example, a memory) and/or a communication interface device (for example, a communication port). Therefore, the subject of the process may be the processor. On the contrary, a process in which the processor becomes the subject may be executed by executing one or more programs. Typically, the processor is a microprocessor such as a central processing unit (CPU). However, the processor may include a hardware circuit that executes a part (for example, encryption/decryption and compression/extension) of the process.

In addition, in the following description, a "logical volume" may be a real logical volume and may be a virtual logical volume. The real logical volume is a logical volume based on one or more drives. The "drive" is a non-volatile physical storage device. For example, the drive is a hard disk drive (HDD) or a solid state drive (SSD). One or more redundant array of independent (or inexpensive) disks (RAID) groups may be configured from a plurality of drives (the RAID groups may be called parity groups). The virtual logical volume may include an external connection logical volume, a thin provisioning (TP) logical volume, and a snapshot logical volume. The external connection logical volume is a logical volume that is based on a storage resource (for example, a logical volume) of an external storage system connected to a storage system and follows storage virtualization technology. The TP logical volume is a logical volume that follows capacity virtualization technology (typically, thin provisioning). The snapshot logical volume is a logical volume that is provided as a snapshot of an original logical volume. The storage system may be configured from one or more storage apparatuses.

In addition, in the following description, when the same types of elements are not distinguished from each other and the description is given, reference numerals are used and when the same types of elements are distinguished from each other and the description is given, identifiers (for example, at least one of numbers and symbols) allocated to the elements may be used, instead of the reference numerals of the elements.

First Embodiment

In this embodiment, a data write process for arranging states of a plurality of data based on a SWA command with a state before writing the data to a storage apparatus or a state after writing the data to the storage apparatus in a computer system having one storage apparatus will be described.

FIG. 1 is a configuration diagram of a computer system according to a first embodiment.

The computer system according to the first embodiment has servers 1 and a storage system. In this embodiment, the storage system has a storage apparatus 2. However, the present invention is not limited to the above configuration. The servers 1 and the storage apparatus 2 are coupled by a network 3. In the drawing, the two servers 1 are coupled to the network 3. However, the number of servers coupled to the network may be one or three or more. The server 1 is a computer to provide a service such as an email and is configured from a workstation or a main frame. The storage apparatus 2 stores data necessary for the service provided by the server 1.

The server 1 transmits a command for data access to the storage apparatus 2 and reads/writes data stored in the storage apparatus 2. As examples of the command for the data access, a read command, a write command, and a SWA command to be the SCSI standard are known.

The network 3 is a communication channel to exchange a command or data between the server 1 and the storage apparatus 2. For example, the network 3 is configured from a storage area network (SAN).

The storage apparatus 2 has a storage controller 4 to execute a process according to a command and drives 5 functioning as auxiliary storage apparatuses.

The storage controller 4 has a server interface (I/F) 6, a processor 7, a main memory 8, a cache memory 9, and a drive I/F 10. The individual units are mutually coupled by an internal network. The server I/F 6 receives a command transmitted from the server 1. The processor 7 and the main memory 8 are operation resources. The processor 7 executes a program stored in the main memory 8, thereby executing various processes according to the command. For example, a data write program, a volume management table 14, a cache management table 19, and a temporary area management table 22 are stored in the main memory 8. The cache memory 9 stores a cache of data in the drive 5. The drive I/F 10 exchanges data with the drives 5.

The drive 5 is a non-volatile storage apparatus. For example, the drive 5 is configured from a hard disk apparatus such as an SAS disk or a semiconductor memory such as an SSD. In order to improve reliability by data redundancy and improve performance by a parallel operation of the drives 5, the storage controller 4 constructs a logical volume 11 from physical storage areas of the plurality of drives 5 and provides the logical volume to the server 1.

As described above, the processor 7 executes a program in the main memory 8, thereby executing the various processes according to the command. However, the storage apparatus 2 is hereinafter described as a process subject to simplify the description.

The various tables stored in the main memory 8 will be described below.

FIG. 2 illustrates an example of the volume management table 14.

The volume management table 14 is a table in which storage areas in the drive 5 and storage areas in the logical volume 11 provided to the server 1 on the basis of the drive 5 are associated with each other by addresses.

The volume management table 14 has an entry for each of the storage areas in the logical volume 11. Each entry has a volume ID 15 to be an identifier of the logical volume 11, an address 16 of each storage area in the logical volume 11, and a drive ID 17 and a physical address 18 of a storage area in the drive 5 corresponding to a storage area in the logical volume 11 shown by the volume ID 15 and the address 16.

Specifically, for example, a storage area in the logical volume 11 shown by a volume ID "0" and an address "1024" corresponds to a storage area in the drive 5 shown by a drive ID "1" and a physical address "1234".

FIG. 3 illustrates an example of the cache management table 19.

The cache management table 19 is a table in which storage areas in the cache memory 9 and storage areas in the logical volume 11 are associated with each other by addresses. A certain entry is generated when data is stored in the storage area of the cache memory 9 and is erased when data is erased from the storage area of the cache memory 9.

The cache management table 19 has an entry for each of the storage areas in the logical volume 11. Each entry has a volume ID 22 to be an identifier of the logical volume 11, an address 23 of each storage area in the logical volume 11, a cache address 24 of a storage area in the cache memory 9 corresponding to a storage area in the logical volume 11 shown by the volume ID 15 and the address 16, and an exclusion flag 25 showing whether exclusiveness of the storage area of the logical volume 11 is secured. Specifically, for example, a storage area in the logical volume 11 shown by a volume ID "0" and an address "1024" corresponds to a storage area on the cache memory 9 shown by a cache address "128" and an exclusion flag thereof is "ON".

Figures 4, 5:
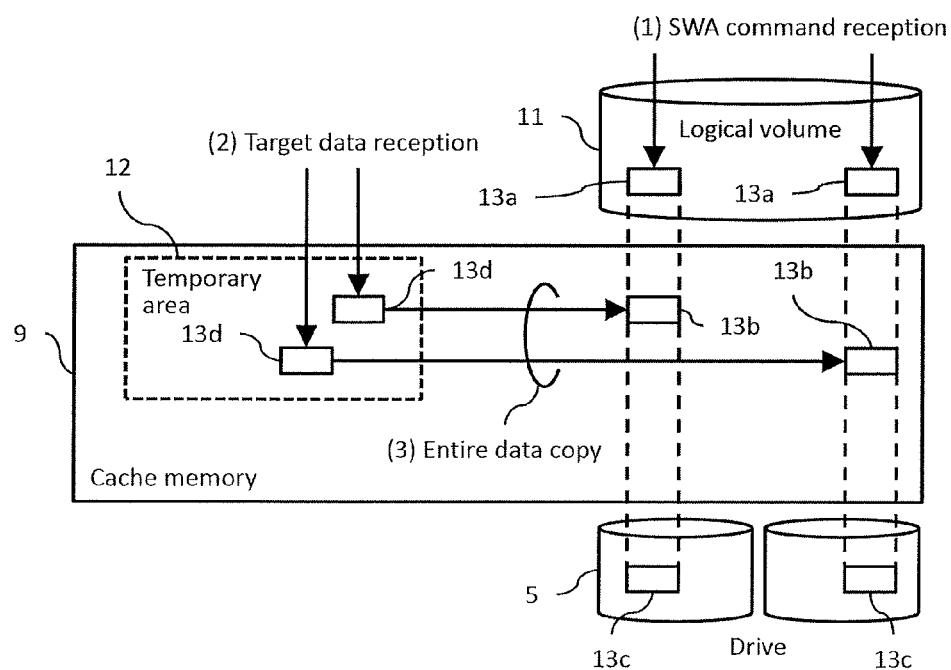
FIG. 4 illustrates an example of a temporary area management table 30.
FIG. 5 is a diagram illustrating an outline of a data write process based on a SWA command according to the first embodiment.

FIG. 4 illustrates an example of the temporary area management table 30.

The temporary area management table 30 is a table to manage a temporary area 12 generated in the cache memory 9.

The temporary area management table 30 has an entry for each storage area in the temporary area 12. Each entry has a temporary area address 31 to be an identifier of the storage area, a volume ID 32 and an address 33 of a logical volume corresponding to the storage area, and a command ID 34 to be an identifier of a command corresponding to data in the storage area. Specifically, for example, data in which a volume ID "0" and an address "1024" are designated by a command ID "1" is stored in a storage area in the temporary area 12 shown by a temporary area address "1000". In addition, data is not stored in a storage area in the temporary area 12 shown by a temporary area address "1001". That is, an entry of the temporary area address "1001" is an empty entry.

FIG. 5 is a diagram illustrating an outline of a data write process based on the SWA command according to the first embodiment.

As described above, in the volume management table 14 and the cache management table 19, a storage area 13a on the logical volume 11, a storage area 13b on the cache memory 9, and a storage area 13c on the drive 5 are associated with each other. The server 1 transmits a write command or a read command having designated each storage area 13a to the storage apparatus 2 and can read/write data of the storage area 13c. When processes based on these commands are executed, the storage apparatus 2 temporarily caches the data stored in the storage area 13c in the storage area 13b having performance higher than performance of the drive 5 and improves input/output performance.

An outline of a data write process when the storage apparatus 2 according to this embodiment receives the SWA command will be described. In the following description, the case in which two write target data based on the SWA command are data to update the data stored in the two storage areas 13a and 13a of the logical volume 11 will be described. However, the number of data based on the SWA command is not limited to two and the data may be data newly stored in the storage area of the logical volume 11.

The SWA command is a command to indicate write of a plurality of target data designated by the parameter list. In the parameter list, a data length, a volume ID of a logical volume to be a write destination, and a head address of a storage area in the logical volume are described for each data of the plurality of target data in a dependency relation. For example, it is assumed that the same operation as an operation when a plurality of write commands is received is executed, when the storage apparatus to which the present invention is not applied receives the SWA command from the server. This is because the storage apparatus to which the present invention is not applied does not have a function according to the SWA command. That is, the storage apparatus repeats a write process of the data received from the server to the drive, for each data, on the basis of the parameter list. In this case, if a problem of any one of the following (A) and (B) occurs during the write process of the data, states of all of the data based on the SWA command in the storage areas of the write destinations cannot be arranged with a state before writing the data or a state after writing the data.

(A) Data read/write based on other command is generated for the storage area of the write destination.

(B) When a plurality of data based on the SWA command is received, reception of partial data fails.

As an example of (A), the case in which write or read of data for a target storage area in the logical volume designated by the SWA command is also designated by other command received during execution of the write process based on the SWA command is assumed. In this case, for example, when other command is a read command, both data before write and data after write based on the SWA command are likely to be acquired from the target storage area. The storage apparatus 2 according to this embodiment arranges the states of all of the data based on the SWA command in the storage areas of the write destinations with the state before the write or the state after the write.

The storage apparatus 2 according to this embodiment can read/write data of the storage area 13c by one command transmission, when the server 1 transmits the SWA command having designated the plurality of addresses showing the two storage areas 13a in the logical volume 11 to the storage apparatus 2.

When the temporary area 12 is provided in the cache memory 9 and the storage apparatus 2 receives the SWA command, the storage apparatus 2 secures the two storage areas 13d in the temporary area 12 and associates the storage areas 13d with the storage areas 13a in the logical volume 11. The storage apparatus 2 temporarily stores the plurality of data based on the SWA command in the storage area 13d in the temporary area 12, in the data write process based on the SWA command.

The storage apparatus 2 receives the SWA command having designated the address showing each storage area 13a on the logical volume 11, from the server 1 (1). At this time, the storage apparatus 2a secures exclusion of the storage area 13a by the SWA command for other command. This means excluding access from other command, for the storage areas 13a of the logical volume 11 of the plurality of write destinations based on the SWA command, during execution of the SWA command.

In addition, the storage apparatus 2 requests the server 1 to transmit target data becoming a write target, for each of the storage areas 13a designated by the addresses.

The storage apparatus 2a executes the data reception process of the target data based on the SWA command (2). Specifically, for example, the storage apparatus 2 stores the target data in the storage area 13d in the temporary area 12 through a buffer of the server I/F 6.

The storage apparatus 2a executes a data decision process, when all of target data are stored in the storage area 13d in the temporary area 12. Specifically, for example, the storage apparatus 2 releases the exclusion of the storage area 13a based on the SWA command and copies all of the target data of the storage area 13d in the temporary area 12 into the storage area 13b (3). Then, the storage apparatus 2 stores the target data of the storage area 13d in the storage area 13c of the drive 5 at appropriate timing.

By the above process, all of the plurality of target data designated by the SWA command are stored in the storage area 13d of the temporary area 12 different from the storage area 13b of the cache memory 9 corresponding to the storage area 13a in the logical volume 11. When all of the target data are stored in the storage area 13d of the temporary area 12, pre-update data of the storage area 13b of the cache memory 9 is updated with the target data. When all of the target data are not stored in the storage area 13d of the temporary area 12, the data of the storage area 13b of the cache memory 9 is not updated by the target data. Thereby, all of the plurality of target data can maintain a state of any one of a state in which the data is written and a state in which the data is not written. That is, consistency of all of the data based on the SWA command can be maintained. In addition, during execution of the SWA command, the exclusion of the storage area designated by the SWA command is secured. During securing of the exclusion, the data cannot be read/written for the storage area (target storage area) of the logical volume designated by the SWA command. For this reason, consistency of all the data based on the SWA command can be maintained even during the execution of the SWA command.

Figure 6:
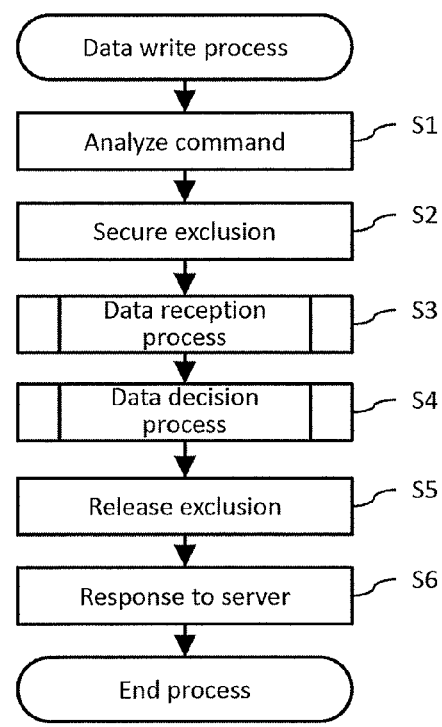
FIG. 6 is a flowchart illustrating the data write process based on the SWA command according to the first embodiment.

FIG. 6 is a flowchart illustrating the data write process based on the SWA command according to the first embodiment.

The data write process is executed when the storage apparatus 2 receives the SWA command from the server 1. This process is executed by executing a data write program stored in the main memory 8 by the processor 7.

The storage apparatus 2 executes command analysis of the received SWA command (S1). Specifically, for example, the storage apparatus 2 specifies a plurality of addresses (volume IDs and addresses) showing the storage areas 13a of the logical volume 11 becoming the write destinations, for the plurality of target data designated by the SWA command, on the basis of the parameter list received together with the SWA command. At this time, the storage apparatus 2 adds a command ID to the transmitted SWA command to identify other command. In the description, the specified volume IDs and addresses are called write destination addresses and the storage areas shown by the addresses are called storage areas of the write destinations.

The storage apparatus 2 secures the exclusion of the storage area 13a designated by the SWA command (S2). Specifically, for example, the storage apparatus 2 checks the exclusion flag 25 by referring to the cache management table 19 in ascending order, for the storage area 13a of the write destination specified on the basis of the parameter list. For example, when the exclusion flag 25 is "OFF" for the storage area 13a of the write destination, the storage apparatus 2 configures "ON" to the exclusion flag 25 of the entry thereof and secures the exclusion. Meanwhile, when the exclusion flag 25 is "ON" for the storage area 13a of the write destination, it means that the exclusion of the storage area 13a is secured by other command and thus, read/write of the data in the storage areas 13b and 13d corresponding to the storage area 13a is disabled. For this reason, the storage apparatus 2 maintains a waiting state until the exclusion flag 21 becomes "OFF". That is, when the exclusion flag 25 is "ON", the storage apparatus 2 causes a process based on other command other than the data write process based on the executing SWA command to be maintained in a waiting state. The order in which the storage apparatus 2 refers to the exclusion flag may be fixed in the storage apparatus 2 and is not limited to the ascending order. For example, the order may be descending order.

The storage apparatus 2 executes a data reception process (S3). The data reception process will be described in detail hereinafter.

The storage apparatus 2 executes a data decision process (S4). The data decision process will be described in detail hereinafter.

The storage apparatus 2 releases the exclusion of the storage area 13a designated by the SWA command (S5). Specifically, for example, the storage apparatus 2 configures the exclusion flag 25 of the cache management table 19 to "OFF", for the storage area 13a of the write destination.

The storage apparatus 2 transmits a response to the SWA command to the server 1 and ends the process (S6). Specifically, for example, the response is a response of any one of whether a write process of the plurality of target data based on the SWA command has succeeded (success response) and whether the write process of the plurality of target data has failed (failure response). When the write process has succeeded, data of the storage area 13b in the cache memory 9 corresponding to the storage area 13a of the write destination is updated with the target data. Accordingly, data of the storage area 13c in the drive 5 corresponding to the storage area 13b is also updated with the target data. Meanwhile, when the write process has failed, the target data of the storage area 13d in the temporary area 12 is not copied into the storage area 13b in the cache memory 9. That is, the data is not updated with the target data. Thus, the storage area 13a of the write destination is maintained in a state before writing the target data based on the SWA command.

By the above process, the exclusion of the storage area designated by the SWA command is secured and write and read of data by other command are prohibited, so that consistency of the data in all of the write destination storage areas designated by the SWA command can be maintained during the execution of the SWA command. In addition, the data write process of the target data based on the SWA command can be executed without being affected by other command.

In addition, in the above process, the data write process based on the SWA command is separated into the data reception process and the data decision process. For this reason, the storage apparatus 2 stores the target data in the storage area 13b on the cache memory 9 by the data decision process (S4), only when all of the target data can be received by the data reception process (S3) of FIG. 6. Thereby, all of the plurality of data based on the SWA command can maintain a state of any one of a state in which the data is written to the drive 5 and a state in which the data is not written to the drive 5.

Figure 7:
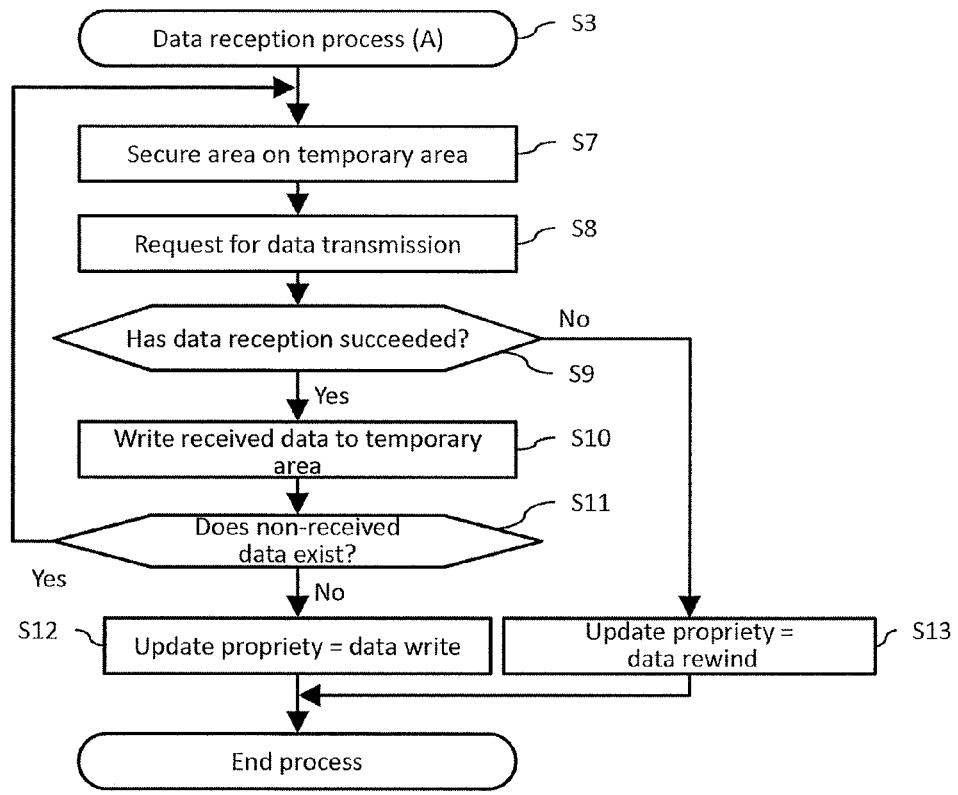
FIG. 7 is a flowchart illustrating a data reception process.

FIG. 7 is a flowchart illustrating the data reception process.

The data reception process is the process of S3 of the data write process.

The storage apparatus 2 secures the storage area 13d to store the plurality of target data based on the SWA command in the temporary area 12 of the cache memory 9 (S7). Specifically, for example, the storage apparatus 2 refers to the temporary area management table 22 and when there is an entry (empty entry) in which the temporary area address 31 is associated with none, the storage apparatus 2 writes the volume ID 32 and the address 33 to be the address of the write destination and the command ID 34 given to the SWA command in the command analysis of S1 to the empty entry.

The storage apparatus 2 refers to the parameter list and requests the server 1 to transmit one target data of the plurality of target data based on the SWA command (S8). When the target data is transmitted from the server 1 according to the request, the server I/F 6 of the storage apparatus 2 receives the target data from the server 1 and stores the target data in a buffer thereof.

The storage apparatus 2 determines whether reception of the target data to the buffer of the server I/F 6 has succeeded. When the reception has failed (S9; No), the storage apparatus 1 configures "data rewind" to a variable "update propriety" (hereinafter, referred to as update propriety information" on a program (S13) and ends the process.

When the reception has succeeded (S9; Yes), the storage apparatus 2 refers to the temporary area management table 22 and writes the received data to the storage areas 13d and 13d in the temporary area 12 of the entry secured by S7 (S10). Specifically, for example, the storage apparatus 2 acquires the target data in the buffer of the server I/F 6 and stores the target data in the storage areas 13d and 13d of the temporary area 12.

The storage apparatus 2 refers to the parameter list and determines whether non-received target data exists among the plurality of target data based on the SWA command (S11). When the non-received target data exists (S11; Yes), the storage apparatus 2 returns the process to S7. When the non-received target data does not exist (S11; No), the storage apparatus 2 configures "data write" to the update propriety information (S12) and ends the process.

By the above process, the target data received in the buffer of the server I/F 6 can be stored temporarily in the temporary area 12. By using the update propriety information, the case in which all of the plurality of target data based on the SWA command can be stored in the temporary area 12 and the case in which all of the plurality of target data cannot be stored in the temporary area 12 can be identified.

Figure 8:
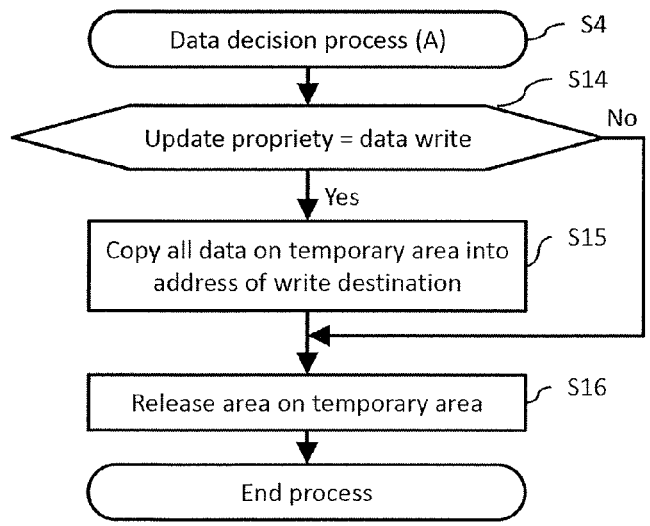
FIG. 8 is a flowchart illustrating a data decision process.

FIG. 8 is a flowchart illustrating the data decision process.

The data decision process is the process of S4 of the data write process.

The storage apparatus 2 determines whether the "data write" is configured to the update propriety information (S14). When the "data write" is not configured to the update propriety information (S14; No), the storage apparatus 2 causes the process to migrate to S16.

Meanwhile, when the "data write" is configured to the update propriety information (S14; Yes), the storage apparatus 2 refers to the temporary area management table 22 and the cache management table 19 and copies the target data in the storage area 13d shown by the temporary area address 31 into the storage area 13b shown by the cache address 24 corresponding to the volume ID 32 (22) and the address 33 (23), for all of the entries corresponding to the command ID 34 given to the SWA command (S15). Then, by destaging, the storage apparatus 2 refers to the cache management table 19 and the volume management table 14 and stores the target data stored in the storage area 13b in the storage area 13d on the drive 5.

When the cache address 24 is an invalid value, the storage apparatus 2 secures a non-used storage area on the cache memory 9, before copying the target data in the storage area 13dd shown by the temporary area address 31. In addition, the storage apparatus configures an address of the secured storage area to the cache address 24 of the cache management table 19. In addition, the storage apparatus specifies an entry of the volume management table 14 which the volume ID 22 (15) and the address 23 (16) of the cache management table 19 correspond to and reads pre-update data of the target data stored in the storage areas 13c and 13c of the drive 5 shown by the drive ID 17 and the physical address 18 of the specified entry to the secured storage area of the cache memory 9.

The storage apparatus 2 refers to the temporary area management table 22, initializes the volume ID 15, the address 16, and the command ID 24 for all of the entries corresponding to the command ID given to the SWA command, sets the entries to empty entries, releases the storage area 13d in the temporary area 12 (S16), and ends the process.

By the above process, all of the plurality of target data based on the SWA command can maintain a state of any one of a state in which the data is written to the storage area 13c on the drive 5 and a state in which the data is not written.

One method of the data write process based on the SWA command has been described. However, the present invention is not limited to the method described above and any method that separates the data write process based on the SWA command into the data reception process (S3) and the data decision process (S4) may be used. Hereinafter, modifications of the data write process based on the SWA command will be described.

Figure 9:
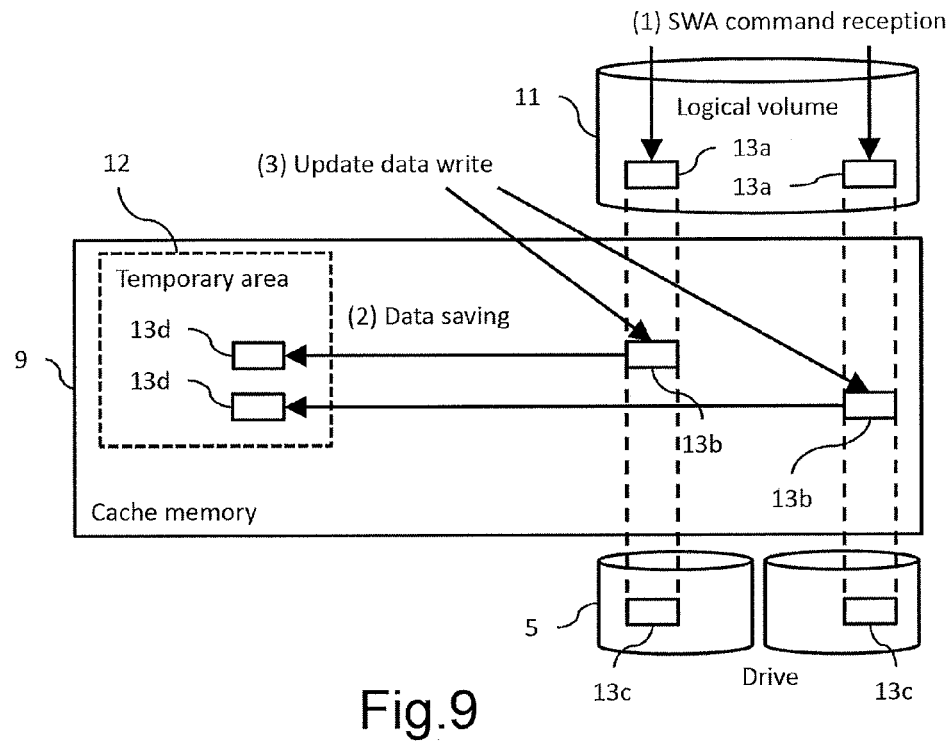
FIG. 9 is a diagram illustrating an outline of a first modification of the data write process based on the SWA command.

FIG. 9 is a diagram illustrating an outline of a first modification of the data write process based on the SWA command.

The first modification is a method of previously saving pre-update data of the target data stored in the storage area 13b on the cache memory 9 in the storage area 13d in the temporary area 12. Hereinafter, a data write process in the method will be described. In the modification, a part of the data reception process (S3) and the data decision process (S4) in the data write process is changed. Description of a part other than the changed part may be omitted.

First, the data reception process (S3) of the first modification will be described. The storage apparatus 2 secures the storage area 13d in the temporary area 12 of the cache memory 9 in S7. In addition, the storage apparatus 2 refers to the parameter list and the cache management table 19 and copies pre-update data of the target data stored in the storage areas 13b of the cache memory 9 corresponding to the storage areas 13a of the write destinations of the plurality of target data based on the SWA command into the secured storage areas 13d (2). At this time, the storage apparatus 2 does not secure the exclusion of the storage area designated by the SWA command. Specifically, for example, the storage apparatus 2 sets the exclusion flag 25 corresponding to the storage area 13a of the write destination to "OFF", in the cache management table 19. In addition, the storage apparatus may configure a flag showing securing of the exclusion to the temporary area address 31 of the storage area 13d, in the temporary area management table 30.

In S10, the storage apparatus 2 writes the plurality of target data based on the SWA command to the storage area 13b on the cache memory 9. The following processes (S11, S12, and S13) are as described above.

Next, the data decision process (S4) of the first modification will be described. In S14, when the "data write" is configured to the update propriety information (S14; Yes), the storage area 13b on the cache memory 9 is in a state in which all of the plurality of target data are written. Thus, the storage apparatus 2 omits S15 and causes the process to migrate to S16.

Meanwhile, in S14, when the "data write" is not configured to the update propriety information (S14; No), at least one target data of the plurality of target data may not be written to the storage area 13b on the cache memory 9. For this reason, the storage apparatus 2 copies all of the pre-update data of the plurality of target data stored in the storage area 13d in the temporary area 12 into the storage area 13b on the cache memory 9. The pre-update data temporarily saved to the storage area 13d on the temporary area 12 can be returned to the original storage area 13b.

In the temporary area management table 30, when the exclusion of the storage area 13d on the temporary area 12 is secured, the storage apparatus 2 may release the exclusion in S16.

By the above process, the target data can be decided only when all of the target data are stored in the storage area 13b on the cache memory 9 by the data reception process (S3). In addition, when reception of at least one target data has failed by the data reception process (S3), the data of the storage area 13d on the temporary area 12 is copied into the storage area 13b on the cache memory 9, so that states of all of the target data can be returned to a state before writing of the data based on the SWA command. In this embodiment, the data can be written directly to the storage area 13b of the cache memory 9 without using the temporary area 12. For this reason, when the data reception process of all of the data based on the SWA command has succeeded, efficiency is good.

Figure 10:
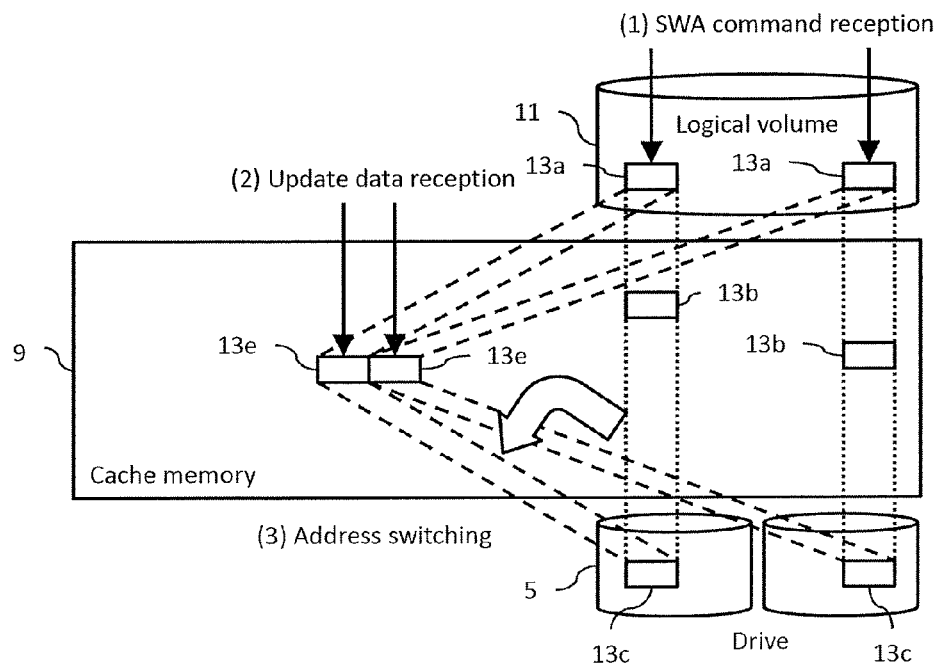
FIG. 10 is a diagram illustrating an outline of a second modification of the data write process based on the SWA command.

FIG. 10 is a diagram illustrating an outline of a second modification of the data write process based on the SWA command.

The second modification is a method of dynamically securing a storage area 13e different from the storage area 13b on the cache memory 9 corresponding to the storage area 13a on the logical volume 11, instead of the storage area 13b, on the cache memory 9, and associating the secured storage area 13e with the storage area 13a on the logical volume 11. Hereinafter, a data write process in the method will be described. In addition, in the second modification, a part of the data reception process (S3) and the data decision process (S4) in the data write process is changed. Description of a part other than the changed part may be omitted.

First, the data reception process (S3) of the second modification will be described. The storage apparatus 2 secures the storage area 13e on the cache memory 9 different from the storage area 13b (refer to the cache management table 19) of the cache memory 9 corresponding to the storage area 13a of the logical volume 11, instead of the storage area 13d in the temporary area 12 of the cache memory 9, in S7.

The storage apparatus 2 refers to the parameter list and stores the plurality of target data based on the SWA command in the secured storage area 13e (2).

At this time, the storage apparatus 2 adds an entry corresponding to an address of a write destination designated by the SWA command to the cache management table 19. In addition, the storage apparatus 2 adds an address of the storage area 13e to a column of the cache address 24 of the added entry. Thereby, in the cache management table 19, two entries of the storage area 13b and the storage area 13e on the cache memory 9 exist for an address of one write destination designated by the SWA command. In addition, for the two entries corresponding to the address showing the storage area 13a of the write destination based on the SWA command, the exclusion flag "ON" is configured to the cache address 24 of the storage area 13b (refer to S2) and the exclusion flag "OFF" is configured to the cache address 24 of the storage area 13e.

In S10, the storage apparatus 2 writes the plurality of target data based on the SWA command to the storage areas 13e and 13e on the cache memory 9. The following processes (S11, S12, and S13) are as described above.

Next, the data decision process (S4) of the second modification will be described. In S15, the storage apparatus 2 replaces the cache address of the entry in which the cache address 24 shows the storage area 13e in the two entries corresponding to the address corresponding to the storage area 13a of the write destination of the cache management table 19, by the address of the storage area 13b. Specifically, for example, the storage apparatus 2 rewrites the cache address 24 showing the storage area 13e in the two entries corresponding to the address of the write destination based on the SWA command, in the storage area 13b. In S16, the storage apparatus 2 erases the entry added in S7, that is, the entry in which the storage area 13b is described in the cache address 24 and "OFF" is configured to the exclusion flag.

By the above process, the target data can be decided only when all of the target data are stored in the storage area 13e on the cache memory 9 by the data reception process (S3). At this time, when the target data is decided, the address of the storage area in which the target data is stored may be changed to the address of the storage area in which the pre-update data of the target data is stored. For this reason, the target data does not need to be copied into other storage area. In addition, when reception of at least one target data has failed by the data reception process (S3), the address of the storage area 13b in which the pre-update data of the target data is stored may be used without a change. In all cases, the target data is not copied into other area of the cache memory 9 and process efficiency is good.

Figure 11:
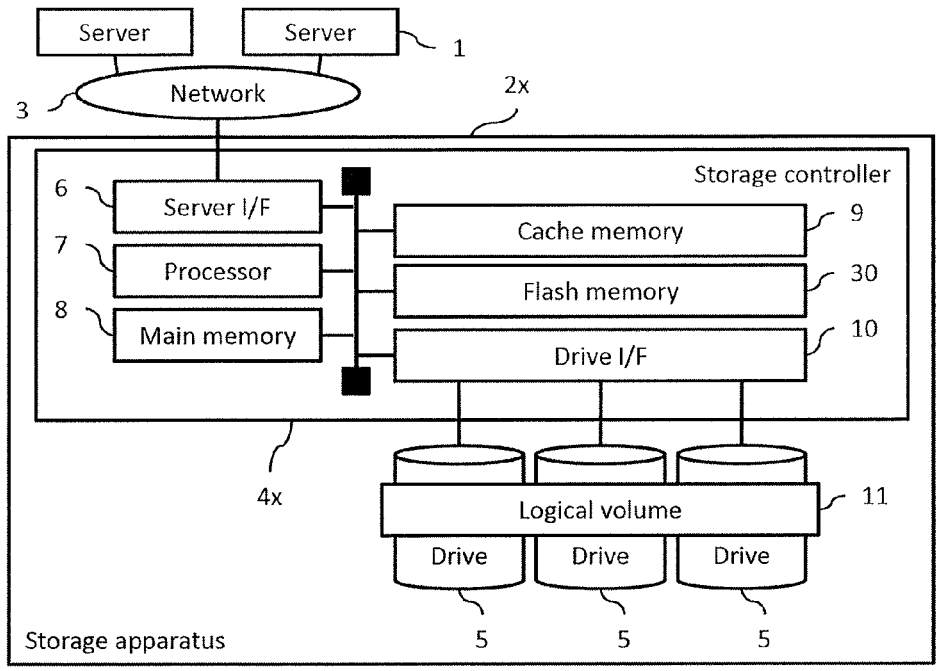
FIG. 11 is a diagram illustrating a first modification of a system configuration of the computer system according to the first embodiment.

FIG. 11 is a diagram illustrating a first modification of a system configuration of the computer system according to the first embodiment.

The computer system according to the first modification has servers 1 and a storage system. In addition, the storage system has a storage apparatus 2x, instead of the storage apparatus 2. The storage apparatus 2x is different from the storage apparatus 2 in that a non-volatile memory is provided in a storage controller 4x. Specifically, for the non-volatile memory, a flash memory 30 is assumed as an example of a non-volatile semiconductor memory. However, the non-volatile memory may be other non-volatile memory. The other configuration is the same as the configuration of the storage apparatus 2.

The flash memory 30 is a non-volatile semiconductor memory that has a speed lower than a speed of a volatile memory used in the cache memory 9 and has a capacity more than a capacity of the volatile memory. The storage apparatus 2x includes the flash memory 30 in the storage controller 4x, so that a new cache tier can be provided between the cache memory 9 and the drive 5. The data write process according to this embodiment is effective in the storage apparatus 2x. For example, in this embodiment, the data write process for the storage area on the cache memory 9 is descried and the temporary area 12 is also generated on the cache memory 9. However, even though a storage area on the cache memory 9 and a storage area on the temporary area 12 corresponding to each of the storage areas of the write destinations are generated on the flash memory 30, this does not affect the data write process according to this embodiment. In addition, even though the storage area on the cache memory 9 and the storage area on the temporary area 12 corresponding to each of the storage areas of the write destinations are generated on the drive 5, this does not affect the data write process according to this embodiment.

Figure 12:
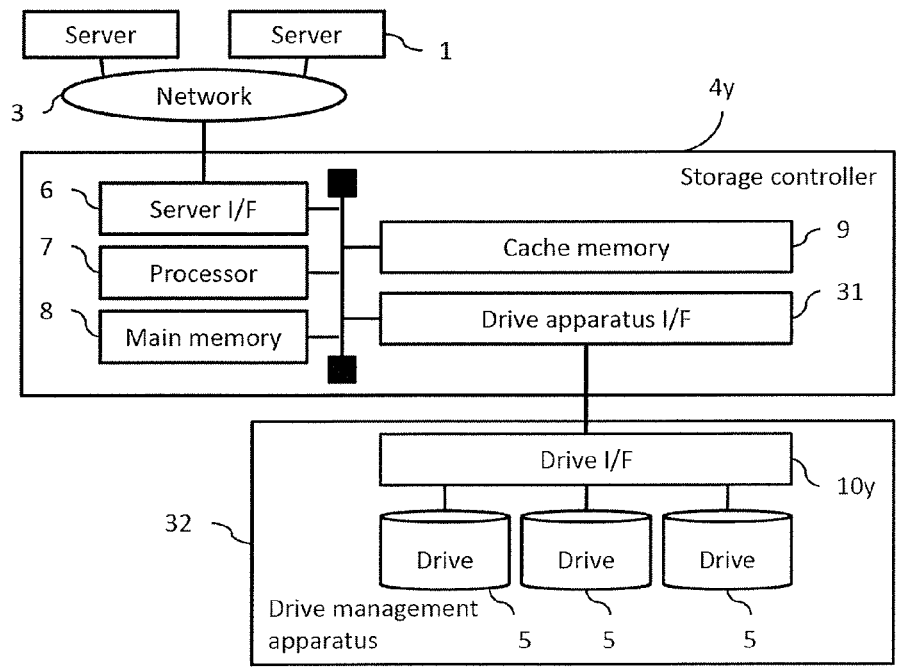
FIG. 12 is a diagram illustrating a second modification of the system configuration of the computer system according to the first embodiment.

FIG. 12 is a diagram illustrating a second modification of the system configuration of the computer system according to the first embodiment.

The computer system according to the second modification has servers 1 and a storage system. The storage system has a storage controller 4y and a drive management apparatus 32. The storage controller 4y and the drive management apparatus 32 are separate apparatuses. The drive management apparatus 32 has a drive I/F 10Y to perform communication with the storage controller 4y. A plurality of drives 5 are coupled to the drive I/F 10Y. The storage controller 4y has a drive apparatus I/F 31 coupled to the drive I/F 10Y to perform communication with the drive management apparatus 32. The configuration of the computer system (storage system) does not affect the data write process according to this embodiment.

Second Embodiment

In the following embodiment, a storage system that has a primary storage apparatus and a secondary storage apparatus and has a remote copy function will be described. The remote copy function is a function of copying data in the primary storage apparatus into the secondary storage apparatus arranged at a remote location synchronously or asynchronously. Thereby, even though an obstacle occurs in one storage apparatus, access on data can be continuously performed by the other storage apparatus.

In the storage system which has the primary storage apparatus and the secondary storage apparatus and to which the present invention is not applied, in the remote copy, the secondary storage apparatus individually performs reception of latest data and writing of data to the self apparatus, for a plurality of data written to the primary storage apparatus. For this reason, if an obstacle occurs at the time of the remote copy, it cannot be ensured that a plurality of data designated by a parameter list of a SWA command maintain a state of any one of a state before write and a state after the write, that is, consistency of the plurality of data is maintained.

In this embodiment, a data write process executed to arrange states of a plurality of data with a state before write or a state after the write in the case in which a synchronous remote copy is configured between a plurality of storage apparatuses will be described.

Figure 13:
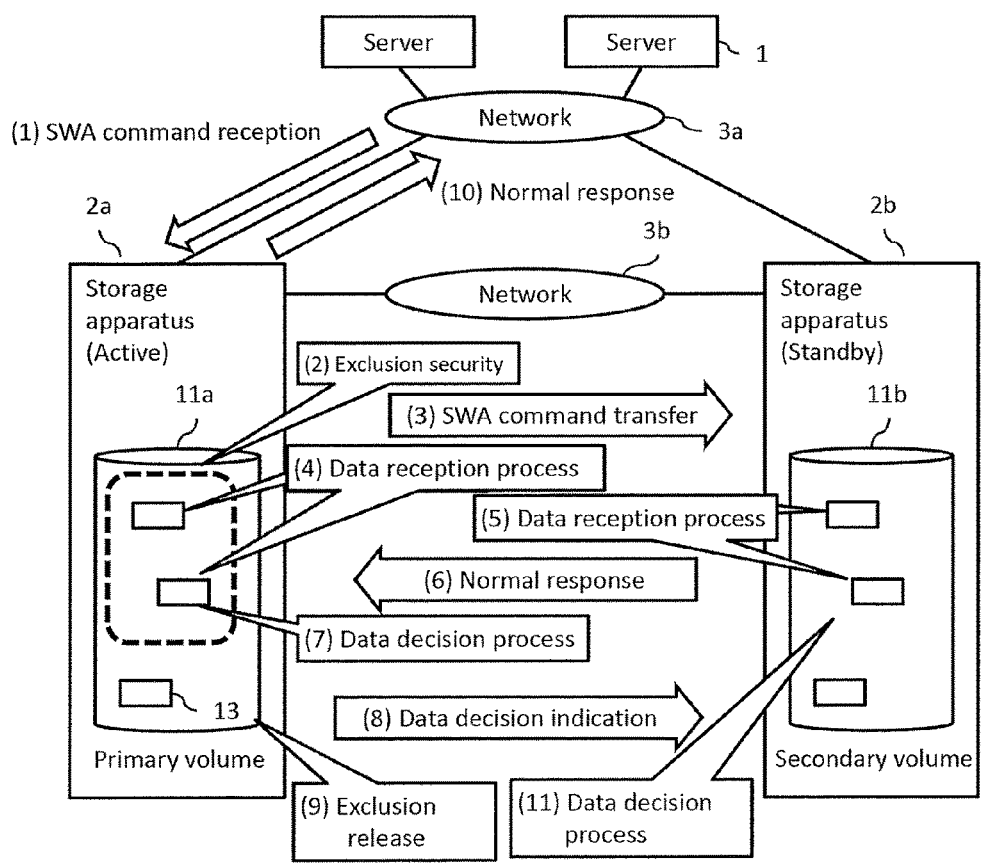
FIG. 13 is a diagram illustrating an outline of a data write process in a computer system according to a second embodiment.

FIG. 13 is a diagram illustrating an outline of a data write process in the computer system according to the second embodiment.

First, a configuration of the computer system according to the second embodiment will be described. The computer system has servers 1 and a storage system. In this embodiment, the storage system has two storage apparatuses 2a and 2b. A configuration of each of the storage apparatuses 2a and 2b is the same as the configurations of the storage apparatuses 2 and 2x or the combination of the storage controller 4y and the drive management apparatus 32 described in the first embodiment (refer to FIGS. 1, 11, and 12). The servers 1 and the storage apparatuses 2a and 2b are coupled by a network 3a. In addition, the storage apparatuses 2a and 2b are mutually coupled by a network 3b. In this embodiment, the network 3b different from the network 3a is provided such that communication between the storage apparatuses 2a and 2b does not exert a bad influence upon the network 3a used by the server 1. However, the networks 3a and 3b may be the same network. In the following description, the storage apparatus 2a is called a primary storage apparatus 2a and the storage apparatus 2b is called a secondary storage apparatus 2b. In addition, a logical volume provided from the primary storage apparatus 2a to the server 1 is called a primary volume 11a and a logical volume provided from the secondary storage apparatus 2b to the server 1 is called a secondary volume 11b.

The storage system according to this embodiment is an active-standby type storage system in which only the primary storage apparatus 2a is operated in a normal mode. In addition, the storage system is a storage system in which the primary volume 11a and the secondary volume 11b form a synchronous remote copy pair. Accordingly, the server 1 transmits an access command to only the primary volume 11a, when the primary volume 11a of the primary storage apparatus 2a can be used, and transmits the access command to the secondary volume 11b of the secondary storage apparatus 2b, only when the primary volume 11a cannot be used.

First, the case in which the primary storage apparatus 2a receives write data based on a write command from the sever 1 will be described. In this case, the primary storage apparatus 2a transfers the write command to indicate writing the write data to the primary volume 11a and writing the write data at the same address as the address of the primary volume 11a in the secondary volume 11b forming the remote copy pair with the primary volume 11a to the storage apparatus 2b.

The storage apparatus 2b receives the write command and the write data, writes the write data to the secondary volume 11b, on the basis of the write command, and transmits a response of write completion to the storage apparatus 2a. The storage apparatus 2a transmits a response of completion of the data write process to the server 1, after the response of the write completion is received, that is, write of the write data is completed in both the primary volume 11a and the secondary volume 11b.

By the above, the data of the primary volume 11a and the secondary volume 11b is synchronized. For this reason, even when the storage apparatus 2a cannot be used due to an obstacle, access from the server 1 can be continuously performed using the data of the secondary volume 11b of the storage apparatus 2b.

In addition, in the storage system according to this embodiment, when a write indication of the plurality of data based on the SWA command is transmitted from the server 1 to the primary storage apparatus 2a, the primary storage apparatus 2a executes a data write process based on the SWA command for the primary volume 11a. In addition, the primary storage apparatus 2a transfers the SWA command to the secondary storage apparatus 2b. Thereby, the secondary storage apparatus 2b executes the data write process based on the SWA command for the secondary volume 11b.

For this reason, in the storage system according to this embodiment, the same program and table as a program and a table stored in a main memory 8 of the primary storage apparatus 2a are also stored in a main memory 8 of the secondary storage apparatus 2b. In addition, in individual tables 14, 19, and 30, the same volume ID and address are given to two logical volumes and two storage areas forming the remote copy pair. However, the present invention is not limited thereto. The two logical volumes and the two storage areas forming the remote copy pair may be associated arbitrarily.

Figure 14:
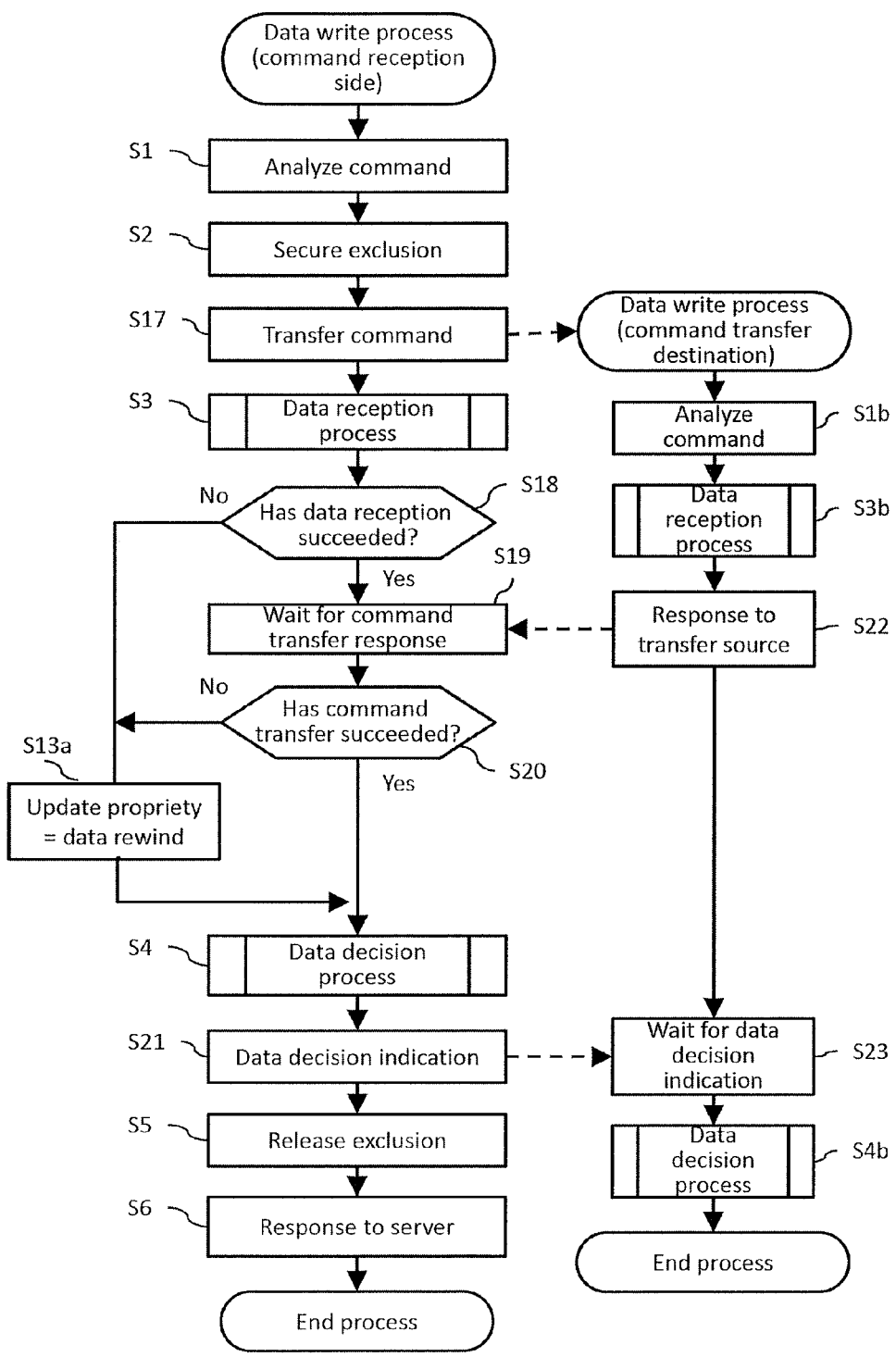
FIG. 14 is a flowchart illustrating the data write process according to the second embodiment.

Hereinafter, an outline of the data write process based on the SWA command according to the second embodiment will be described using FIGS. 13 and 14. FIG. 13 is a diagram illustrating an outline of the data write process based on the SWA command according to the second embodiment. FIG. 14 is a flowchart illustrating the data write process according to the second embodiment.

In the description, a difference with the first embodiment will be mainly described and description of a different portion may be omitted. In the following description, the case in which a plurality of target data based on the SWA command are data to update data stored in the storage area in the logical volume 11 will be described. However, the present invention is not limited thereto and the plurality of target data may be new data.

The data write process is executed when the primary storage apparatus 2a receives the SWA command from the server 1. This process is executed when a processor 7 of the primary storage apparatus 2a executes a data write program stored in the main memory 8 thereof and a processor 7 of the secondary storage apparatus 2b executes a data write program stored in the main memory 8 thereof. The same steps as the steps in the first embodiment are denoted with the same reference numerals.

The primary storage apparatus 2a receives the SWA command having designated addresses showing the two storage areas on the primary volume 11a from the server 1 and executes command analysis of the received SWA command (S1) (FIG. 13(1)).

The primary storage apparatus 2a secures exclusion of the storage area designated by the SWA command (S2) (FIG. 13(2)). Specifically, for example, in the cache management table 19, an exclusion flag corresponding to a storage area of a write destination of the primary volume is configured to "ON".

The primary storage apparatus 2a transfers the SWA command to the secondary storage apparatus 2b (S17) (FIG. 13(3)). In the SWA command, an address showing a storage area of the secondary volume 11b corresponding to a storage area of the primary volume 11a is designated.

The primary storage apparatus 2a executes a data reception process (S3) (FIG. 13(4)). The data reception process is as described in FIG. 7. In addition, the primary storage apparatus 2a determines whether the data reception process has succeeded (S18). When the data reception process has succeeded, "data write" is configured to update propriety information. When the data reception process has failed, "data rewind" is configured to the update propriety information. When the data reception process has failed (S18; No), the primary storage apparatus 2a causes the process to migrate to S4. Meanwhile, when the data reception process has succeeded (S18; Yes), the primary storage apparatus 2a waits for a response to command transfer from the secondary storage apparatus 2b (S19).

The secondary storage apparatus 2b receives the SWA command from the primary storage apparatus 2a and executes command analysis of the received SWA command (S1a). Specifically, for example, the secondary storage apparatus 2b specifies an address (volume ID and address) of the write destination showing the storage area of the write destination of the secondary volume 11b, for the plurality of target data designated by the SWA command, on the basis of the parameter list received together with the SWA command.

At this time, the secondary storage apparatus 2b adds a command ID to the transmitted SWA command to identify other command. In addition, the secondary storage apparatus 2b requests the primary storage apparatus 2a to transmit the target data becoming the write target to the primary storage apparatus 2a, for each storage area of the secondary volume 11b based on the SWA command.

The secondary storage apparatus 2b executes the data reception process (S3b) (FIG. 13(5)). In this embodiment, the data reception process executed by the secondary storage apparatus 2b is as follows. For example, the secondary storage apparatus 2b receives the target data according to the request through a buffer of a server I/F 6 and stores the target data in a storage area of the cache memory 9. This is because the storage system according to this embodiment is the active-standby type storage system and thus, access is not had directly to the secondary storage apparatus 2b until an obstacle occurs in the primary storage apparatus 2a.

The secondary storage apparatus 2b transmits a response to command transfer to the primary storage apparatus 2a (S22). When all of the target data based on the SWA command are received, the secondary storage apparatus 2b transmits a success response (FIG. 13(6)) and when all of the target data based on the SWA command are not received, the secondary storage apparatus 2b transmits a failure response. For example, when all of the plurality of target data based on the SWA command are stored in the storage area of the cache memory 9, the secondary storage apparatus 2b transmits a success response. In this case, the secondary storage apparatus 2b waits for a data decision indication from the primary storage apparatus 2a (S23).

The primary storage apparatus 2a determines whether the command transfer has succeeded, that is, the received response is the success response (S20). When the command transfer has succeeded (S20; Yes), the primary storage apparatus 2a causes the process to migrate to S4. This case means that the data reception process of each of the primary storage apparatus 2a and the secondary storage apparatus 2b succeeds and the "data write" is configured to the update propriety information. Meanwhile, when the command transfer has not succeeded (S20; No), it means that the data reception process of any one of the primary storage apparatus 2a and the secondary storage apparatus 2b or the data reception processes of both the primary storage apparatus 2a and the secondary storage apparatus 2b have failed. For this reason, the primary storage apparatus 2a configures "data rewind" to the update propriety information again (S13a) and causes the process to migrate to S4.

The primary storage apparatus 2a executes the data decision process (S4) (FIG. 13(7)). The data decision process is as described in FIG. 8.

The primary storage apparatus 2a transmits an indication of the data decision process to the secondary storage apparatus 2b (S21) (FIG. 13(8)). In addition, the primary storage apparatus 2a releases exclusion of the storage area designated by the SWA command (S5) (FIG. 13(9)). Specifically, for example, the primary storage apparatus 2a configures an exclusion flag 25 of the cache management table 19 to "OFF", for the storage area of the write destination of the primary volume 11a.

The primary storage apparatus 2a transmits the response to the SWA command to the server 1 (S6) and ends the process. For the response, when all the processes have succeeded, the primary storage apparatus 2a transmits a success response (FIG. 13(10)) and when any process has failed, the primary storage apparatus 2a transmits a response of a process failure.

The secondary storage apparatus 2b receives the data decision indication of S21, executes the data decision process (FIG. 13(11)), and ends the process. Specifically, for example, the secondary storage apparatus 2b releases the exclusion of the storage area designated by the SWA command and copies all of the target data of the storage area in the temporary area 12 into the storage area of the cache memory 9.

By the above process, the primary storage apparatus 2a to which the server 1 has access secures exclusion of the storage area designated by the SWA command and write and read for the storage area by other command from the server 1 are prohibited, so that consistency of data in all of the write destination storage areas designated by the SWA command can be maintained during the execution of the SWA command. In addition, the data write process of the target data based on the SWA command can be executed without being affected by other command.

As described above, the storage system according to this embodiment is an active-standby type storage system in which only the primary storage apparatus 2a is operated in a normal mode and is a storage system in which the primary volume 11a and the secondary volume 11b form a synchronous remote copy pair. In the storage system, when the primary storage apparatus 2a receives the SWA command from the server 1, all of the plurality of target data based on the SWA command can maintain a state of any one of a state in which the data is written to the drive 5 of each of the storage apparatuses 2a and 2b and a state in which the data is not written. Specifically, when both the data reception process of the primary storage apparatus 2a and the data reception process of the secondary storage apparatus 2b have succeeded, the data decision processes of the primary storage apparatus 2a and the secondary storage 2b are executed. In this case, the plurality of target data based on the SWA command are written to the drives 5 of both the storage apparatuses 2a and 2b. Meanwhile, when the data reception process of any one of the storage apparatuses 2a and 2b has failed, the plurality of target data based on the SWA command are not written to the drives 5 of both the storage apparatuses 2a and 2b, by rewind of the data.

In the storage system to which the present invention is not applied, when the server executes the data write process based on the SWA command for the primary storage apparatus, the following problems occur. In this case, for example, the primary storage apparatus should transmit a plurality of write commands to the secondary storage apparatus, using the remote copy process according to the related art, to synchronize the primary volume and the secondary volume with each other. For this reason, in the case in which the secondary storage apparatus writes the target data to the secondary volume, if the storage apparatus fails in receiving the partial write commands due to an obstacle, a write state of data cannot be arranged as follows.

(C) A write state of the target data is different in each of the plurality of write destination storage areas in the secondary volume 11b.

(D) A write state of the target data of the write destination storage area showing the same address is different in the primary volume 11a and the secondary volume 11b.

In the storage system according to this embodiment, even in the remote copy, the SWA command is used between the primary storage apparatus 2a and the secondary storage apparatus 2b and the data write process in the secondary storage apparatus 2b is separated into the data reception process and the data decision process, so that the occurrence of (C) can be prevented.

In addition, each of the storage apparatuses 2a and 2b executes the data reception process and determines whether reception of all of the data based on the SWA command has succeeded or failed, by the update propriety information. For this reason, the write state of the data between the primary volume 11a and the secondary volume 11b can be arranged and the occurrence of (D) can be prevented.

In S17, S19, and S21, when the primary storage apparatus 2a cannot perform communication with the storage apparatus 2b, the primary storage apparatus 2a may determine that the data of the secondary volume 11b cannot be ensured, isolate the secondary volume 11b, and continuously execute an input/output process by only the primary volume 11a.

In addition, in S22 and S23, when the secondary storage apparatus 2b cannot perform communication with the primary storage apparatus 2a, the secondary storage apparatus 2b may configure the data rewind to the update propriety information and arrange a state of the data with a state before the update, so that the state of the data in the secondary volume 11b at the time of the communication failure may be ensured as the state before the update and an isolation condition of the secondary volume 11b may be alleviated. For example, when the storage apparatus 2a determines the data rewind in S13, the state of the data of the primary volume 11a and the secondary volume 11b is arranged with the state before the update even though the storage apparatus 2a cannot perform communication with the storage apparatus 2b in S21. Therefore, the secondary volume 11b may not be isolated.

In addition, if an operation regarding the remote copy is performed when the primary storage apparatus 2a transmits the target data to the secondary storage apparatus 2b, the secondary storage apparatus 2b may not receive a part of the target data. For example, when the exclusion of the storage area designated by the SWA command of the side of the primary storage apparatus 2a is secured by S2, the operation regarding the remote copy may be on standby until the exclusion is released.

Third Embodiment

A storage system according to this embodiment is an active-active type storage system in which both a primary storage apparatus 2a and a secondary storage apparatus 2b are operated in a normal mode and is a storage system in which a primary volume 11a and a secondary volume 11b form a synchronous remote copy pair. Therefore, a server 1 can transmit an access command to both the primary volume 11a of the primary storage apparatus 2a and the secondary volume 11b of the secondary storage apparatus 2b and can read/write data for both the volumes 11a and 11b. In this embodiment, a difference with the first and second embodiments will be mainly described and description of a different portion may be omitted.

A configuration of the storage system according to this embodiment is the same as the configuration of the second embodiment. As described above, the storage system according to this embodiment is the active-active type storage system. For this reason, as compared with the storage system according to the second embodiment, a communication channel between the server 1 and the primary storage system 2a and a communication channel between the server 1 and the secondary storage apparatus 2b and resources of the secondary storage apparatus 2b can be used for read/write of data by the server 1 in a normal mode and entire process efficiency of the storage system can be improved.

However, in addition to the problems of (C) and (D) appointed by the second embodiment, it is necessary to prevent the following problems from occurring.

(E) Pre-update data and post-update data of certain data may be read from the secondary volume 11*b*.

(F) When consistency of the primary volume 11*a* and the secondary volume 11*b* is not maintained by a certain command, the primary volume 11*a* or the secondary volume 11*b* should be isolated from the storage system, until a next command for the secondary storage apparatus 2*b* is transmitted. In this case, the server 1 should switch the destination of the command transmitted to the isolated primary volume 11*a* or secondary volume 11*b* into the secondary volume 11*b* or the primary volume 11*a* functioning without the isolation.

Figures 15, 16:
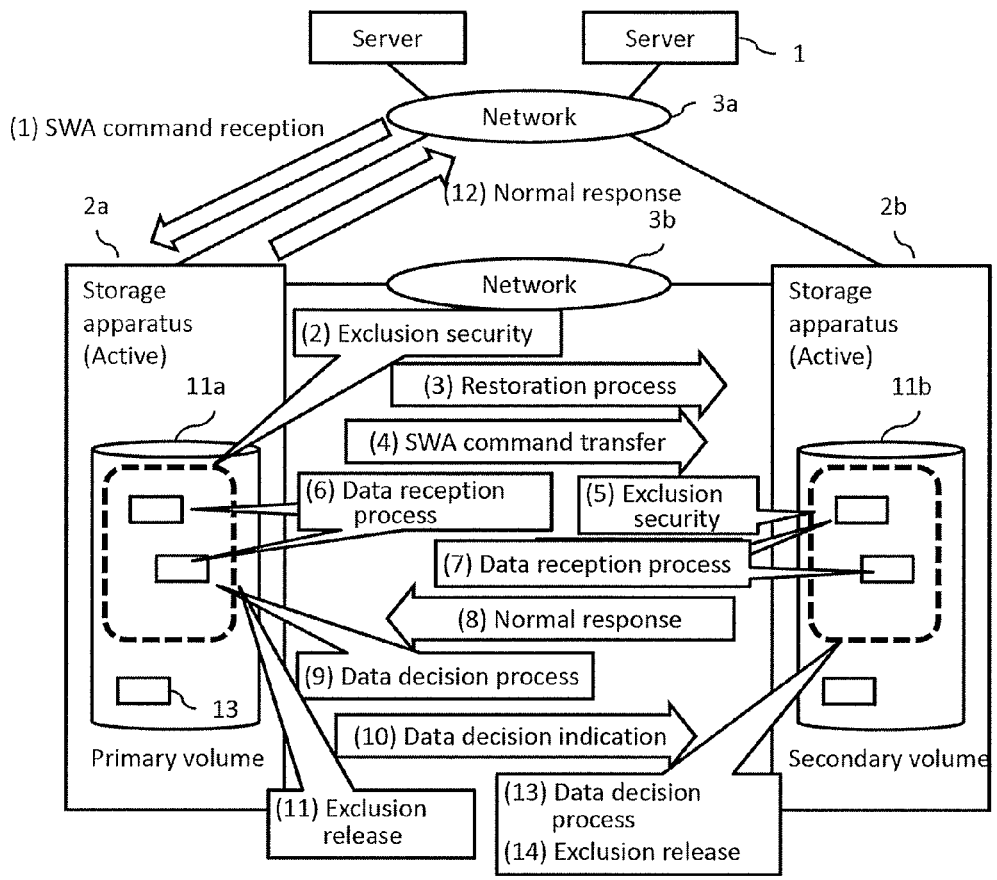
FIG. 15 is a diagram illustrating an outline of a data write process based on a SWA command according to a third embodiment.
FIG. 16 illustrates an example of a cache management table 19a according to the third embodiment.

FIG. 15 is a diagram illustrating an outline of a data write process based on the SWA command according to the third embodiment. In the following description, the case in which a plurality of target data based on the SWA command are data to update data stored in the storage area in the logical volume 11 will be described. However, the present invention is not limited thereto.

In this embodiment, when the secondary storage apparatus 2*b* receives the SWA command transferred from the primary storage apparatus 2*a* (4), the exclusion of the storage area designated by the SWA command is secured (5). In addition, the data decision indication is received from the primary storage apparatus 2*a* (10) and the data decision process is executed (13). Then, the exclusion of the storage area designated by the SWA command is released (14). Thereby, the execution of the SWA command is not affected by other command and the occurrence of (E) can be prevented.

In addition, the primary storage apparatus 2*a* having received the SWA command from the server 1 secures the exclusion of the storage area designated by the SWA command (2). Then, a restoration process to be described below is executed, so that the occurrence of (F) can be prevented. Specifically, even when communication between the primary storage apparatus 2*a* and the secondary storage apparatus 2*b* is failed and consistency of the primary volume 11*a* and the secondary volume 11*b* is not taken, the restoration process (3) is executed during the execution of the SWA command, so that the primary volume 11*a* or the secondary volume 11*b* can be continuously used without isolating the primary volume 11*a* or the secondary volume 11*b* from the storage system. The restoration process is a remote copy between the primary volume 11*a* and the secondary volume 11*b*, for example. The restoration process will be described in detail below. When the restoration process has failed, the primary volume 11*a* or the secondary volume 11*b* is isolated. The storage apparatuses 2*a* and 2*b* hold information on whether the consistency of the logical volumes 11*a* and 11*b* is taken, for the restoration process. For example, the information is held by the cache management table 19*a*. However, the information may be held by other information.

FIG. 16 illustrates an example of the cache management table 19*a* according to the third embodiment.

The cache management table 19*a* is stored in each of the main memory 8 of the primary storage apparatus 2*a* and the main memory 8 of the secondary storage apparatus 2*b*. The cache management table 19*a* has an entry for each storage area of the logical volume of each storage apparatus 2. Each entry has a restoration flag 25 corresponding to the storage area in the logical volume 11, in addition to the volume ID 15, the address 16, the cache address 20, and the exclusion flag 21 corresponding to the storage area in the logical volume 11. Specifically, for example, when the restoration flag is "ON", this shows that the restoration is necessary because data of the storage area of the primary volume 11*a* and data of the storage area of the corresponding secondary volume 11*b* are not matched. Here, the same volume ID and address are given to the corresponding storage area. However, the present invention is not limited thereto.

Hereinafter, a data write process based on the SWA command according to the third embodiment will be described. The data write process according to the third embodiment is the same as the data write process according to the second embodiment. For this reason, a difference with the second embodiment will be mainly described. Hereinafter, the case in which the primary storage apparatus 2*a* receives the SWA command from the server 1 will be described.

The primary storage apparatus 2*a* having received the SWA command secures the exclusion of the storage area designated by the SWA command (S2) after the command analysis (S1). Then, the primary storage apparatus 2*a* executes the restoration process between the primary volume 11*a* and the secondary volume 11*b* before executing the command transfer (S17) (refer to FIG. 12). In the restoration process, the primary storage apparatus 2*a* refers to the cache memory management table 19*a* and refers to the restoration flag 25 corresponding to the volume ID 15 and the address 16 corresponding to the address of the storage area of the primary volume 11*a* designated by the SWA command. When an entry in which the restoration flag 25 is "ON" exists, the primary storage apparatus 2*a* transmits data of the storage area of the primary volume 11*a* to the secondary storage apparatus 2*b* by the write command. In addition, the secondary storage apparatus 2*b* writes the data of the storage area of the primary volume 11*a* to the storage area of the corresponding secondary volume 11*b*. Each of the primary storage apparatus 2*a* and the secondary storage apparatus 2*b* configures OFF to the restoration flag 25 corresponding to the storage area of the cache memory management table 19*a* thereof. The case in which the primary storage apparatus 2*a* receives the SWA command from the server 1 has been described. However, the case in which the secondary storage apparatus 2*b* receives the SWA command from the server 1 is also the same. However, in this case, the secondary storage apparatus 2*b* reads the data of the storage area of the primary volume 11*a* by the read command and writes the data to the corresponding storage area of the secondary volume 11*b*. After the execution of the restoration process, the primary storage apparatus 2*a* executes the process after S17 illustrated in FIG. 14.

The restoration flag 25 in the cache management table 19*a* is configure to "ON", so that information showing that data between the logical volumes 11*a* and 11*b* forming the remote copy pair is mismatched and the restoration is necessary can be stored. When the SWA command is received from the server 1, consistency between the logical volumes 11*a* and 11*b* can be maintained by executing the restoration process. When the primary storage apparatus 2*a* or the secondary storage apparatus 2*b* receives a command requiring read/write of data other than the SWA command, the primary storage apparatus 2*a* or the secondary storage apparatus 2*b* may refer to the restoration flag 25 of the cache management table 19*a*, for the storage area of the logical volume 11 thereof designated by the received command, before reading/writing the target data. When the restoration flag 25 is "ON", the secondary storage apparatus 2*b* copies data of the storage area of the primary volume 11*a* into the corresponding storage area of the secondary volume 11*b*, configures OFF to the restoration flag 25, and executes read/write of the data in the secondary volume 11b. In addition, when the restoration flag 25 is "OFF", the secondary storage apparatus 2b executes read/write of data in the secondary volume 11b.

Figure 17:
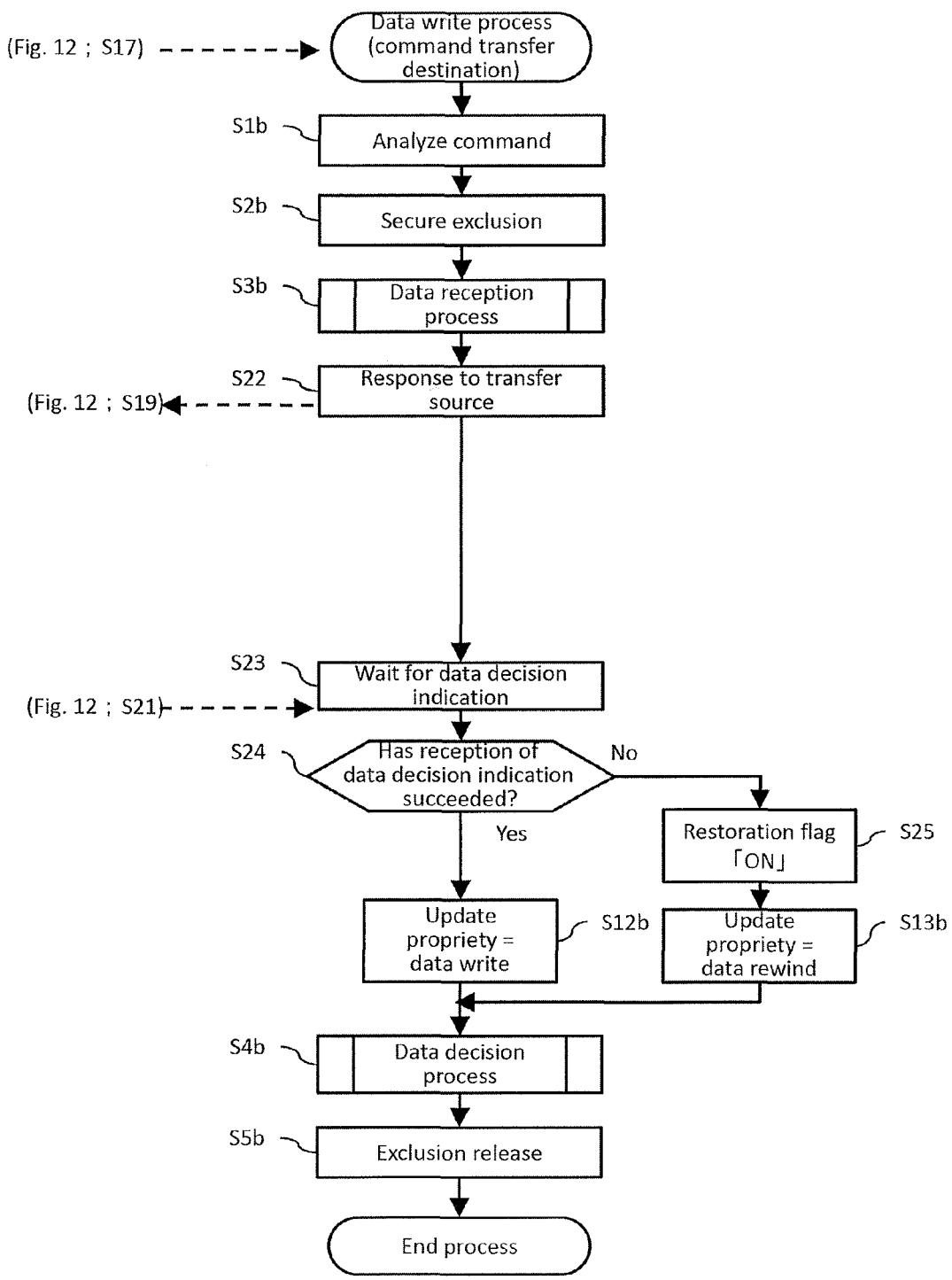
FIG. 17 is a flowchart illustrating a data write process executed by a storage apparatus of a transfer destination of the SWA command in the third embodiment.

FIG. 17 is a flowchart illustrating the data write process executed by the storage apparatus of the transfer destination of the SWA command in the third embodiment. The case in which the transfer destination of the SWA command is the secondary storage apparatus 2b will be described hereinafter. The secondary storage apparatus 2b executes the following process in addition to the write process according to the second embodiment.

The secondary storage apparatus 2b receives the SWA command and the parameter list transferred from the primary storage apparatus 2a and executes the command analysis of the SWA command (S1b). Then, the secondary storage apparatus 2b refers to the cache management table 19a and secures the exclusion of the storage area designated by the SWA command (S2b). A method of securing the exclusion of the SWA command is the same as S2.

After the secondary storage apparatus 2b executes the data reception process (S3b), the secondary storage apparatus 2b transmits a response to the command transfer to the primary storage apparatus 2a (S22) and waits for a data decision indication from the primary storage apparatus 2a (S23). This point is the same as the second embodiment.

After S23, the secondary storage apparatus 2b determines whether reception of the data decision indication has succeeded (S24). Update propriety information is included in the data decision indication. When the data decision indication is received and the update propriety information is "data write", it is assumed that the reception of the data decision indication has succeeded. Meanwhile, when the data decision indication cannot be received for a constant time or the data decision indication is received, but the update propriety information is "data rewind", it is assumed that the reception of the data decision indication has failed. Accordingly, the determination may be performed when the data decision indication is received or a state in which the data decision indication cannot be received is continuously maintained for a constant time. When the reception of the data decision indication has succeeded, the secondary storage apparatus causes the process to migrate to S4b. Meanwhile, when the reception of the data decision indication has failed, the secondary storage apparatus 2b configures "ON" to the restoration flag 25 corresponding to the storage areas of all of the target data based on the SWA command of the cache management table 19a (S25). In addition, the secondary storage apparatus 2b configures the data rewind to the update propriety information again (S13b) and causes the process to migrate to S4b.

After the secondary storage apparatus 2b executes the data decision process (S4), the secondary storage apparatus 2b releases the exclusion of the storage area designated by the SWA command and ends the process (S5b). A method of releasing the exclusion is the same as S5.

By the above process, in the storage system, when the primary storage apparatus 2a receives the SWA command from the server 1, all of the plurality of target data based on the SWA command can maintain a state of any one of a state in which the data is written to the drive 5 of each of the storage apparatuses 2a and 2b and a state in which the data is not written. Specifically, when both the data reception process of the primary storage apparatus 2a and the data reception process of the secondary storage apparatus 2b have succeeded, the data decision processes of the primary storage apparatus 2a and the secondary storage 2b are executed. In this case, the plurality of target data based on the SWA command are written to the drives 5 of both the storage apparatuses 2a and 2b. Meanwhile, when the data reception process of any one of the storage apparatuses 2a and 2b has failed, the plurality of target data based on the SWA command are not written to the drives 5 of both the storage apparatuses 2a and 2b, by the rewind of the data.

As described above, the storage system according to this embodiment is the active-active type storage system in which both the primary storage apparatus 2a and the secondary storage apparatus 2b are operated in a normal mode and is the storage system in which the primary volume 11a and the secondary volume 11b form a synchronous remote copy pair. For this reason, the primary storage apparatus 2a to which the server 1 has access secures exclusion of the storage area designated by the SWA command and write and read of the data by other command from the server 1 are prohibited, so that consistency of data in all of the write destination storage areas designated by the SWA command can be maintained during the execution of the SWA command. In addition, the data write process of the target data based on the SWA command can be executed without being affected by other command. In addition, in the storage system, the secondary storage apparatus 2b also receives the command from the server 1. For this reason, the secondary storage apparatus 2b also secures the exclusion of the storage area designated by the SWA command, so that write and read of data by other command from the server 1 are prohibited. Thereby, consistency of data in all of the write destination storage areas designated by the SWA command can be maintained during the execution of the SWA command. In addition, the data write process of the target data based on the SWA command can be executed without being affected by other command.

Fourth Embodiment

A storage system according to this embodiment has the same configuration as that of the second embodiment. Specifically, the storage system according to this embodiment is an active-standby type storage system in which only a primary storage apparatus 2a is operated in a normal mode and is a storage system in which a primary volume 11a and a secondary volume 11b form a synchronous remote copy pair. However, in the storage system according to this embodiment, the secondary storage apparatus is the storage apparatus according to the related art and a write process based on the SWA command cannot be executed. Therefore, a cost necessary to construct the storage system executing a remote copy process can be saved.

Figure 18:
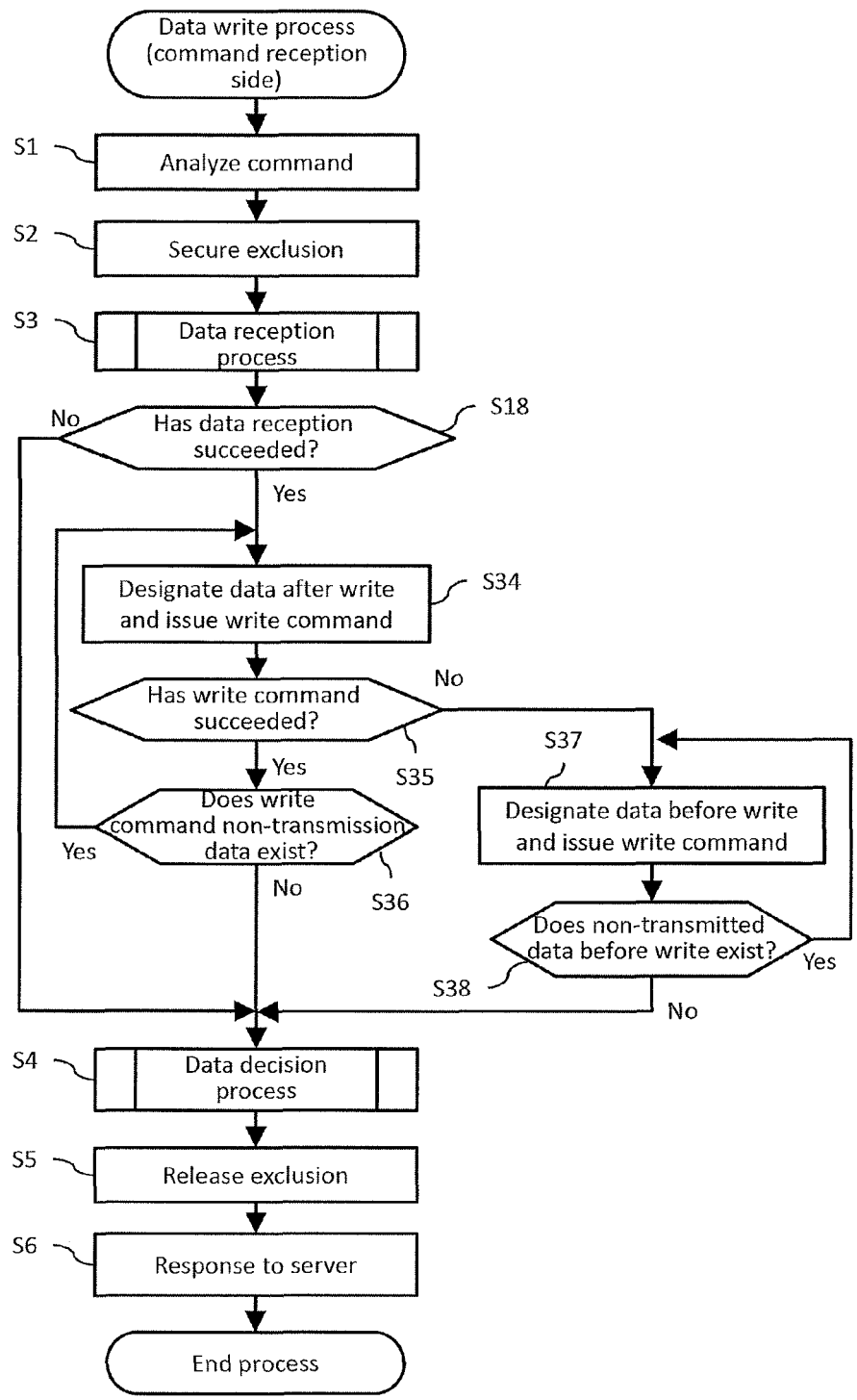
FIG. 18 is a flowchart illustrating a data write process according to a fourth embodiment.

FIG. 18 is a flowchart illustrating a data write process according to the fourth embodiment.

In the description, a difference with the second embodiment will be mainly described and description of a different portion may be omitted. In the following description, the case in which a plurality of data based on the SWA command are target data to update data stored in a storage area in the logical volume 11 will be described. However, the present invention is not limited thereto and the data may be new data.

A data write process is executed when the primary storage apparatus 2a receives the SWA command from the server 1. This process is executed when a processor 7 of the primary storage apparatus 2a executes a data write program stored in a main memory 8 thereof. Hereinafter, only a process of the side of the primary storage apparatus 2a will be described.

The same steps as those in the second embodiment are denoted with the same reference numerals.

After executing S1 (command analysis) and S2 (exclusion securing), the primary storage apparatus 2a executes a data reception process without transferring the SWA command to the secondary storage apparatus 2b (S3). The processes of S1 to S3 are the same as the processes in the second embodiment (FIG. 6).

The primary storage apparatus 2a determines whether the data reception process has succeeded (S18). When the data reception process has succeeded, "data write" is configured to update propriety information. When the data reception process has failed, "data rewind" is configured to the update propriety information. When the data reception process has failed (S18; No), the primary storage apparatus 2a causes the process to migrate to S4.

Meanwhile, when the data reception process has succeeded (S18; Yes), the primary storage apparatus 2a designates any one data of a plurality of target data based on the SWA command and transmits a write command to the secondary storage apparatus (S34). In addition, the primary storage apparatus 2a waits for a response to the write command. The primary storage apparatus 2a determines whether the write command has succeeded, that is, a response from the secondary storage apparatus 2b is a success response. When the write command has succeeded (S35; Yes), it is determined whether target data in which the write command is not transmitted to the secondary storage apparatus 2b exists in the plurality of target data based on the SWA command. When non-transmitted target data exists (S36; Yes), the primary storage apparatus 2a returns the process to S34. Meanwhile, when the non-transmitted target data does not exist (S36; No), the primary storage apparatus 2a causes the process to migrate to S4.

In S35, when the write command has failed (S35; No), the primary storage apparatus 2a designates pre-update data of any one target data of the plurality of target data based on the SWA command and transmits the write command to the secondary storage apparatus 2b (S37). In addition, the primary storage apparatus 2a waits for a response to the write command. The primary storage apparatus 2a determines whether pre-update data not transmitted to the primary storage apparatus 2a exists in the pre-update data corresponding to the plurality of target data based on the SWA command. When the non-transmitted pre-update data exists (S38; Yes), the primary storage apparatus 2a returns the process to S37. Meanwhile, when the non-transmitted pre-update data does not exist (S38; No), the primary storage apparatus 2a causes the process to migrate to S4.

The primary storage apparatus 2a executes the data decision process (S4), releases the exclusion secured by S2 (S5), transmits a response (success response or failure response) of process completion to the server (S6), and ends the process.

By the above process, even in the storage system having the secondary storage apparatus that cannot execute the write process based on the SWA command, when the SWA command is received from the server 1, all of the plurality of target data based on the SWA command can maintain a state of any one of a state in which the data is updated and a state in which the data is not updated. In addition, a remote copy pair in the primary volume 11a and the secondary volume 11b can be arranged in a state in which the data is updated with a plurality of target data or a state in which the data is not updated.

That is, in this embodiment, the primary storage apparatus 2a manages a data write state of the secondary volume 11b and transmits the write command to the secondary storage apparatus, so that the data write state of the secondary volume 11b can be operated.

The outline of the process of the SWA command in the case in which the storage apparatus 2b of the remote copy destination does not corresponding to the SWA command has been described.

As described above, the storage system according to the second to fourth embodiments is the storage system in which the primary volume 11a and the secondary volume 11b form the synchronous remote copy pair. For this reason, in the data write process based on the SWA command, the primary storage apparatus 2a having received the SWA command executes the write of the data to the primary volume 11a thereof and the remote copy for the secondary volume 11b of the secondary storage apparatus 2b as the series of processes.

Fifth Embodiment

In this embodiment, a difference with the first to fourth embodiments will be mainly described and description of a different portion may be omitted. Hereinafter, an expression of writing data to a logical volume 11 is used to simplify the description. This means that the data is written to a storage area on a cache memory 9 corresponding to a storage area on the logical volume 11. Likewise, an expression of receiving data in the logical volume 11 means that data to be written to the logical volume 11 is written to a temporary area or the data is written to a storage area of the cache memory 9 corresponding to the storage area of the logical volume 11 in a state in which the data is returned to data before write.

A configuration of a storage system according to this embodiment is the same as the configurations according to the second and third embodiments, except that a primary storage apparatus 2a and a secondary storage apparatus 2b have journals 26a and 26b, respectively (refer to FIG. 20 to be described below). Each of the journals 26a and 26b may be stored in a storage area of as a main memory 8 or the cache memory 9 of each of the storage apparatuses 2a and 2b. The storage system according to this embodiment is an active-standby type storage system in which only the primary storage apparatus 2a is operated in a normal mode and is an asynchronous storage system in which a primary volume 11a and a secondary volume 11b form an asynchronous remote copy pair.

Before a data write process based on a SWA command in the storage system according to this embodiment is described, an asynchronous storage system according to the related art will be described.

In the storage system according to the related art, when a primary storage apparatus receives a write command, write data based on the write command is written to a primary volume thereof and a response to the write command is transmitted to a server 1. In addition, the primary storage apparatus performs a remote copy for a secondary volume of a secondary storage apparatus asynchronously with write of the write data to the primary volume thereof. Here, the asynchronization means any moment. For example, internal information of the primary storage apparatus or the secondary storage apparatus such as every constant time may be used as a moment and an operation by a manager and a storage apparatus in which the frequency of receiving a command is equal to or less than a constant value or a determinable external factor may be used as the moment.

Specifically, for example, when the write command is received, the primary storage apparatus specifies an address of a storage area of a primary volume of a storage destination of write data and stores the write data in the storage area. Then, the primary storage apparatus adds a new entry to the journal and stores an address of a storage area to store the write data and a size of the write data. Then, at appropriate timing, when the primary storage apparatus refers to the journal and an entry exists in the journal, the primary storage apparatus transmits information included in the entry and write data in a storage area designated by a volume ID and an address of the entry to the secondary storage apparatus. Here, the journal is a list in which information regarding write of data to separate write of the data and the remote copy in the asynchronous storage system, that is, difference information of data stored in the remote copy pair is recorded.

The secondary storage apparatus receives the information of the entry and the write data and adds the received information of the entry to the journal thereof. Then, the secondary storage apparatus refers to the journal thereof, stores the write data in a corresponding storage area of the secondary volume, and erases the entry thereof.

In the asynchronous storage system, the primary storage apparatus separates moments of the write of the write data to the primary volume and the remote copy for the secondary volume, so that an influence on a process based on the command by the remote copy can be decreased. For example, when the primary storage apparatus frequently receives a command such as the write command, the remote copy is not executed and when the frequency of receiving the command is small, the remote copy is executed. As a result, entire process performance of the storage system can be prevented from being deteriorated.

In the storage system in which the primary volume and the secondary volume form the asynchronous remote copy pair, the primary storage apparatus does not transmit the information of the entry of the journal of the primary storage apparatus to the secondary storage apparatus and the secondary storage apparatus may acquire the information from the primary storage apparatus. In addition, the secondary storage apparatus does not store the received information of the entry and the write data in the journal 26b and the temporary area. In the reception process, the secondary storage apparatus may specify the storage area shown by the received entry and write the received data.

In the asynchronous storage system to which the present invention is not applied, for example, when the SWA command is transmitted from the server 1, entries of a plurality of target data becoming write targets based on the SWA command are registered in the journal. However, if any obstacle occurs when information of the plurality of entries is transmitted to the secondary storage apparatus 2b, states of the plurality of storage areas in the secondary volume 11b updated with the target data may not be arranged with a state of any one of a state before the update and a state after the update. In order to solve such a problem, the storage system according to this embodiment has a function of managing the plurality of target data based on the SWA command as a group of data.

Figures 19, 20:
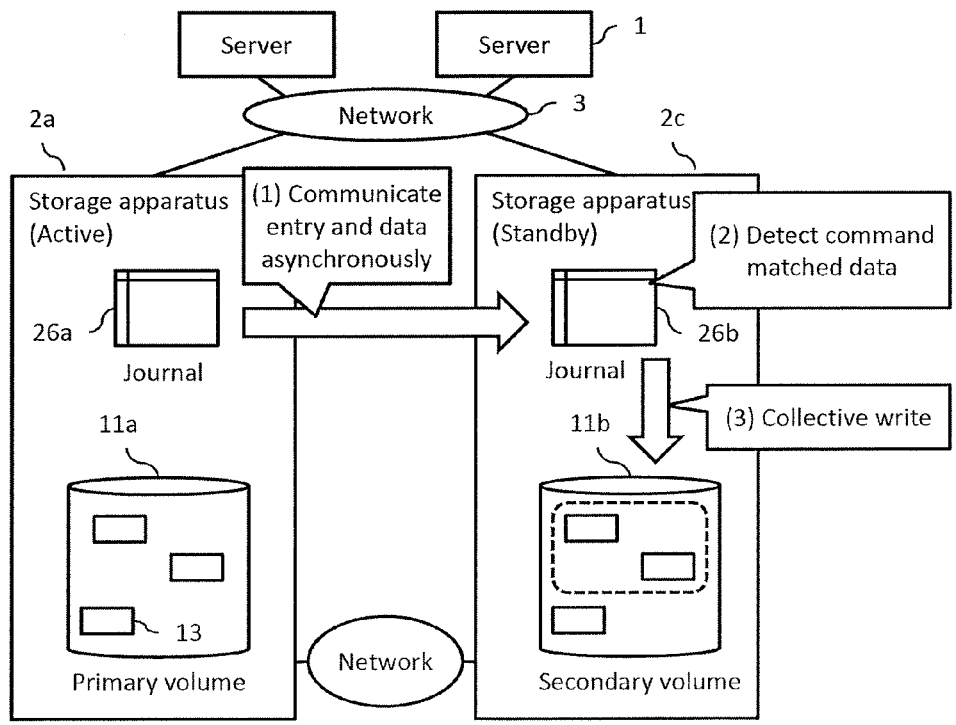
FIG. 19 illustrates an example of a journal 26.
FIG. 20 is a diagram illustrating an outline of a data write process based on a SWA command executed by a storage system according to a fifth embodiment.

FIG. 19 illustrates an example of the journal 26.

The journal 26 is a list in which information regarding write of data to separate write of the data and the remote copy in the asynchronous storage system, that is, difference information of data stored in the remote copy pair is recorded in the asynchronous storage system. The journal 26 has an entry for each of the storage areas in which the data written to the primary volume 11a is stored. Each entry has a volume ID 261 to be an identifier of the primary volume 11a, an address 263 of a storage area in the primary volume 11a, a size 265 of the storage area, a command ID 267 to identify a command having designated the data stored in the storage area, and an entry number 269 showing the number of data designated by the command, for example.

The command ID 268 and the entry number 269 are added to the storage area of each entry, so that the plurality of target data based on the SWA command can be managed as a group of data.

FIG. 20 is a diagram illustrating an outline of a data write process based on the SWA command in the storage system according to the fifth embodiment.

The primary storage apparatus 2a receives the SWA command executes the data write process according to the first embodiment (refer to FIG. 6). In the data write process, the primary storage apparatus 2a stores the plurality of target data based on the SWA command in the storage area of the primary volume 11a and in the difference registration process, the primary storage apparatus 2a registers the entries of the plurality of target data in the journal 26a. The difference registration process may be executed at the time of the data decision process (S4) or at appropriate timing after the data decision process. In the difference registration process, the primary storage apparatus 2a gives an identifier to manage the plurality of target data as one data group to the entries of the plurality of target data based on the SWA command of the journal 26a. The identifier is a command ID 268 and an entry number 269 given to the entry of the journal 26, for example. Then, the primary storage apparatus 2a asynchronously transmits the information of the entry of the journal 26a and the data corresponding to the entry to the secondary storage apparatus 2c (1).

The secondary storage apparatus 2c receives the information of the entry of the journal 26a and the data corresponding to the entry. In addition, the secondary storage apparatus 2c registers the information of the entry in the journal 26b and registers the received data in the temporary area 12 of the cache memory 9. Then, in the difference update process, the secondary storage apparatus 2c refers to the journal 26b, detects all of the plurality of target data based on the SWA command, on the basis of the identifier (2), and collectively writes the data in the storage area of the secondary volume 11b (3).

The storage apparatus 2a does not transmit the information of the entry in the journal 26a to the storage apparatus 2b and the secondary apparatus 2b may acquire the information of the entry in the journal 26b. In addition, the storage apparatus 2b does not store the received entry information and target data in the journal 26b and the temporary area. In the reception process, the storage apparatus 2b may specify the storage area shown by the received entry and write the received data.

Figure 21:
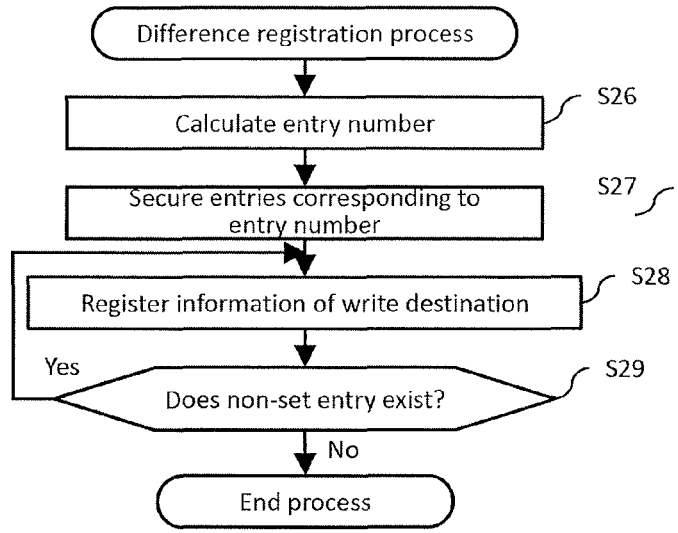
FIG. 21 is a flowchart illustrating a difference registration process executed by a primary storage apparatus 2*a*.

FIG. 21 is a flowchart illustrating the difference registration process executed by the primary storage apparatus 2a.

The primary storage apparatus 2a calculates the number of entries added, on the basis of the number of addresses of write destinations based on the SWA command, that is, the number of target data (S26). The primary storage apparatus 2a adds the entries of the calculated number (S27).

The primary storage apparatus 2a configures a write destination address of the target data, a command ID 24, and an entry number to each added entry (S28). The primary storage apparatus 2a determines whether an entry to which these values are not configured exists in the added entries (S29). When the non-configured entry exists (S29; Yes), the primary storage apparatus 2a returns the process to S28.

Meanwhile, when the non-configured entry does not exist (S29; No), the primary storage apparatus 2a ends the process.

Figure 22:
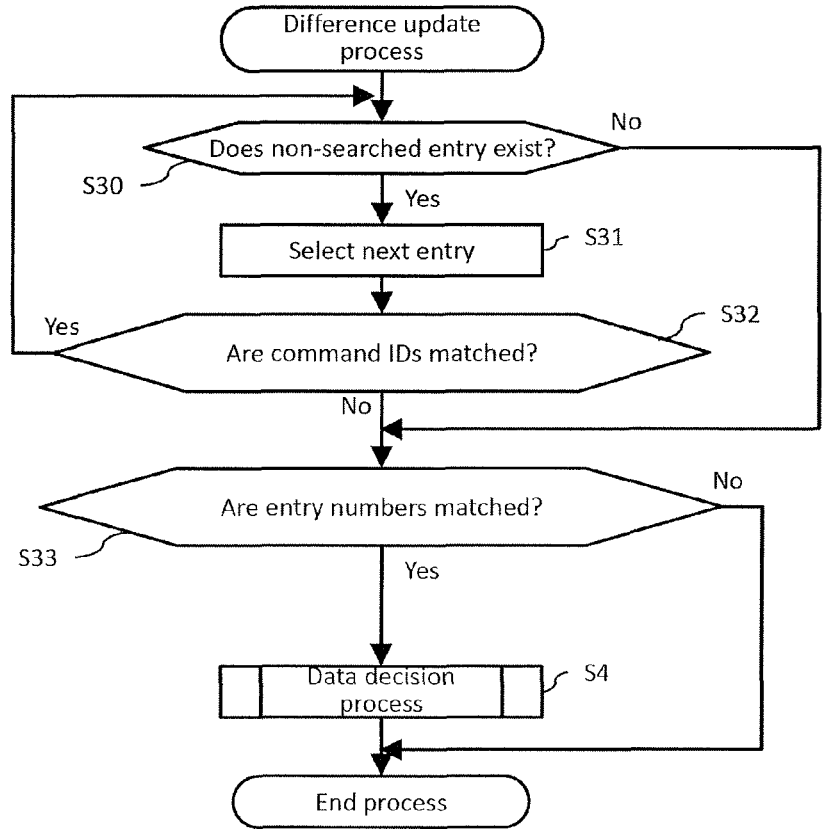
FIG. 22 is a flowchart illustrating a difference registration process executed by a secondary storage apparatus 2*c*.

FIG. 22 is a flowchart illustrating the difference update process executed by the secondary storage apparatus 2c.

The difference update process is a process for writing the target data to the secondary volume 11b, which is executed by the secondary storage apparatus 2c. Hereinafter, the difference update process will be specifically described.

The secondary storage apparatus 2c refers to the journal 26b and determines whether a non-searched entry exists (S30). When the non-searched entry does not exist (S30; No), the secondary storage apparatus 2c causes the process to migrate to S33. Meanwhile, when the non-searched entry exists (S30; Yes), the secondary storage apparatus 2c selects the entry (S31) and determines whether the command ID 24 of the selected entry and a command ID of an entry of a head of the journal 26b to which the command ID showing the SWA command is configured are matched (S32).

When the command IDs 24 of the entries are matched (S32; Yes), the secondary storage apparatus 2c means that the selected entry is a target entry based on the SWA command. Therefore, the secondary storage apparatus 2c returns the process to S30 to refer to a next entry. Meanwhile, when the command IDs 24 of the entries are not matched (S32; No), the secondary storage apparatus 2c means that the selected entry is not the target entry. Therefore, the secondary storage apparatus 2c sets the selected entry as the non-searched entry and causes the process to migrate to S33.

The secondary storage apparatus 2c compares an entry number of the target entries and an entry number 28 of head entries of the journal 26b to which the command ID showing the SWA command is configured (S33). When the entry numbers are matched (S33; Yes), the secondary storage apparatus 2c determines that the information of the entry based on the SWA command and the target data have been completely received and executes the data decision process (S4) for the target data. Meanwhile, when the entry numbers are not matched (S33; No), the secondary storage apparatus 2c determines that the information of the entry based on the SWA command and the target data have been completely received and ends the process.

By the above process, all of the plurality of target based on the SWA command can maintain a state of any one of a state in which the data is written to both the storage area of the primary volume 11a and the storage area of the secondary volume 11b forming the remote pair with the primary volume 11a and a state in which the data is not written.

The example of the data write process in the active-standby type storage system in which only the primary storage apparatus 2a is operated in the normal mode and the asynchronous storage system in which the primary volume 11a and the secondary volume 11b form the asynchronous remote copy pair has been described. However, the data write process in the asynchronous storage system is not limited to the above example. For example, if both the primary storage apparatus 2a and the secondary storage apparatus 2c can recognize all of the plurality of target data based on the SWA command as a group of data, the data write process may be executed by other method. Hereinafter, first and second modifications of the difference update process in the data write process will be described. In these modifications, the same effect as the effect of the write process in this embodiment described above is obtained.

Next, the first modification of the difference update process will be described.

For example, an item of the entry number 269 may be removed for each of the entries of the journals 26a and 26b illustrated in FIG. 19. In this case, when entries are added (S27 in FIG. 21), the continuous entries are added as entries based on the SWA command. Thereby, the continuous entries showing the same command ID 267 are a group of entries based on the SWA command.

A flow of the first modification of the difference update process will be described using FIG. 22 again.

The storage apparatus 2b determines whether the non-searched entry exists (S30), selects the entry (S31), and determines whether a command ID 24 of the selected entry and a command ID 24 of an entry of a head of the journal 26b to which the command ID showing the SWA command is configured (S32).

When the command IDs 24 of these entries are matched (S32; Yes), the secondary storage apparatus 2c means that the selected entry is the target entry based on the SWA command. Therefore, the secondary storage apparatus 2c returns the process to S30 to refer to a next entry. Meanwhile, when the command IDs 24 of the entries are not matched (S32; No), the secondary storage apparatus 2c means that the selected entry is not the target entry and a group of entries based on the SWA command ends. Therefore, the secondary storage apparatus 2c sets the selected entry as the non-searched entry and ends the process without causing the process to migrate to S33.

Next, a second modification of the difference update process will be described.

Figures 23, 24:
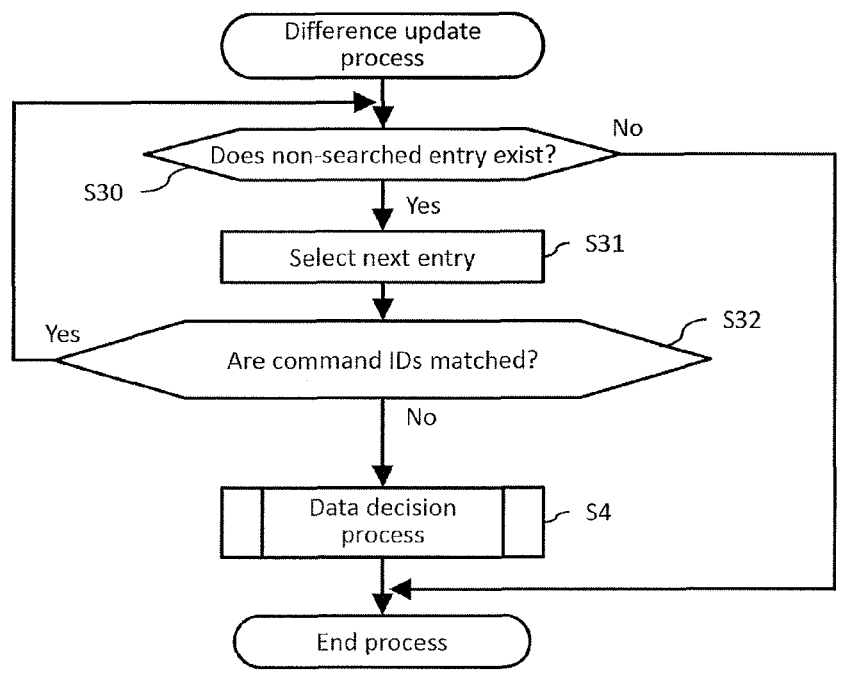
FIG. 23 illustrates another example of a journal 26.
FIG. 24 is a flowchart illustrating a first modification of a difference update process.

For example, as illustrated in FIG. 23, item of the command ID 267 and the entry number 269 may be removed for each of the entries of the journals 26a and 26b. In this case, when entries are added (S27 in FIG. 21), the continuous entries may be added as entries based on the SWA command and a guard 290 to be an end marker showing an end of an entry based on the SWA command may be configured to a next entry of the continuous entries.

FIG. 24 is a flowchart illustrating the second modification of the difference update process.

The storage apparatus 2b determines whether the non-searched entry exists (S30) and selects the entry (S31). Next, the storage apparatus 2b determines whether the selected entry is the guard 290. The guard 290 is an entry that can be distinguished from a normal entry having an invalid value. When the selected entry is not the guard 290 (S32; No), the secondary storage apparatus 2c returns the process to S30. Meanwhile, when the selected entry is the guard (S32; Yes), the secondary storage apparatus 2c sets the entries to the entry selected immediately before the guard 290 as a group of entries based on the SWA command, determines that the information of the entry based on the SWA command and the target data have been completely received, and executes the data decision process (S4) for the target data.

The first processor, the first memory, and the first storage device correspond to the processor 7, the main memory 8, and the drive 5 in the storage apparatuses 2 and 2a according to the first to fifth embodiments. The second processor, the second memory, and the second storage device correspond to the processor 7, the main memory 8, and the drive 5 in the secondary storage apparatus 2b of the synchronous remote storage system according to the second to fourth embodiments. The third processor, the third memory, and the third storage device correspond to the processor 7, the main memory 8, and the drive 5 in the secondary storage apparatus 2c of the asynchronous remote storage system according to the fifth embodiment.

In addition, the held data corresponds to the pre-update data and the write data corresponds to the target data. The first logical volume corresponds to the first primary volume 11a and the second logical volume corresponds to the secondary volume 11b. The logical storage area corresponds to the storage area 13a, the first or second device storage area corresponds to the storage area 13c, the first storage area corresponds to the storage area 13b in the cache memory 9 in the storage apparatus 2 or the primary storage apparatus 2a, the second storage area corresponds to the storage area 13d in the temporary area 12, and the third storage area corresponds to the storage area 13e dynamically generated differently from the storage area 13a in the cache memory 9. The fourth storage area corresponds to the storage area in the cache memory 9 in the secondary storage apparatus 2b, the fifth storage area corresponds to the storage area in the temporary area 12, and the sixth storage area (different from the fourth storage area) corresponds to the storage dynamically generated in the cache memory 9. The first, second, and third volume information correspond to the volume management table 14 and the first and second cache information and the first memory information correspond to the cache management table 19.

Some embodiments have been described. However, the present invention is not limited to the embodiments and various changes can be made without departing from a scope of the present invention.

REFERENCE SIGNS LIST

1: server, 2, 2a, 2b: storage apparatus, 3, 3a, 3b: network, 4: storage controller, 5: drive, 6: server I/F, 7: processor, 8: main memory, 9: cache memory, 10: drive I/F, 11, 11a, 11b: logical volume, 12: temporary area, 13a, 13b, 13c, 13d: storage area, 14: volume management table, 19, 19a: cache management table, 22: temporary area management table, 26, 26a, 26b, 26c: journal, 30: flash memory, 31: drive apparatus I/F, 32: drive management apparatus

The invention claimed is:

1. A storage system comprising:
a first storage device;
a first processor coupled to a server computer and the first storage device; and
a first memory coupled to the first processor, wherein
the first processor provides a first logical volume to the server computer, on the basis of the first storage device,
the first memory stores first volume information showing an association of a plurality of logical storage areas in the first logical volume and a plurality of first device storage areas in the first storage device,
the first storage device stores a plurality of holding data in the plurality of first device storage areas,
the first memory stores the plurality of holding data,
when the first processor receives a command to indicate designating a plurality of addresses showing the plurality of logical storage areas, respectively, and writing a plurality of write data to the plurality of logical storage areas, respectively, from the server computer,
the first processor executes a data reception process for receiving the plurality of write data based on the command from the server computer and writing the plurality of write data to storage areas different from storage areas in which the plurality of holding data is stored in the first memory,
the first processor determines whether all of the plurality of write data are written to the first memory,
when it is determined that all of the plurality of write data are written to the first memory, the first processor transmits a first success response to the host computer,
when the plurality of write data satisfies a predetermined condition, the first processor writes the plurality of write data in the first memory to the plurality of first device storage areas, respectively, and
when it is determined that at least a part of the plurality of data is not written to the first memory, the first processor transmits a first failure response to the host computer.

2. The storage system according to claim 1, wherein the first processor causes a process of other command to designate the plurality of logical storage areas to be maintained in a waiting state, until the determination ends after the command is received.

3. The storage system according to claim 2, further comprising:
a second storage device;
a second processor coupled to the server computer, the first processor, and the second storage device; and
a second memory coupled to the second processor, wherein
the second processor provides a second logical volume, on the basis of the second storage device,
the second memory stores second volume information showing an association of the plurality of logical storage areas and a plurality of second device storage areas in the second storage device,
the second storage device stores a plurality of holding data in the plurality of second device storage areas, respectively,
the second memory stores the plurality of holding data,
the first processor transfers the command to the second processor,
when the command is received, the second processor receives the plurality of write data based on the command from the first processor and writes the plurality of write data to storage areas different from storage areas in which the plurality of holding data is stored in the second memory,
the second processor determines whether all of the plurality of write data are written to the second memory,
when it is determined that all of the plurality of write data are written to the second memory, the second processor transmits a second success response to the first processor and when it is determined that at least a part of the plurality of data is not written to the second memory, the second processor transmits a second failure response to the first processor,
when it is determined that all of the plurality of write data are stored in the first memory and the second success response is received from the second processor, the first processor notifies the second processor of information showing that all of the plurality of write data are stored in the first memory and the second success response is received from the second processor and transmits the first success response to the server computer,
when the plurality of write data satisfies a predetermined condition, the first processor writes the plurality of write data in the first memory to the plurality of first device storage areas, respectively, and
when the notification is received and the plurality of write data satisfies the predetermined condition, the second processor writes the plurality of write data in the second memory to the plurality of second device storage areas, respectively.

4. The storage system according to claim 3, wherein the second processor causes a process of other command to designate a plurality of second logical storage areas of the second logical volume corresponding to the plurality of first logical storage areas based on the command to be maintained in a waiting state, until the determination ends after the command is received.

5. The storage system according to claim 4, wherein
the first memory stores first cache information showing an association of the plurality of logical storage areas and a plurality of first cache areas in the first memory,
the second memory stores second cache information showing an association of the plurality of logical storage areas and the plurality of second cache areas,
the first processor determines whether data stored in the plurality of first cache areas and data stored in the plurality of second cache areas are matched after the command is received and before the command is transferred, and
the first processor copies the data stored in the first cache areas, which is determined as data not matched with the data stored in the second cache areas, into the corresponding second cache areas.

6. The storage system according to claim 2, further comprising:
a second storage device;
a second processor coupled to the server computer, the first processor, and the second storage device; and
a second memory coupled to the second processor, wherein
the second processor provides a second logical volume, on the basis of the second storage device,
the second memory stores second volume information showing an association of the plurality of logical storage areas in the first logical volume and a plurality of second device storage areas in the second storage device,
the second storage device stores a plurality of holding data in the plurality of second device storage areas, respectively,
the second memory stores the plurality of holding data,
when it is determined that all of the plurality of write data are written to the first memory, the first processor generates a journal including the plurality of addresses and command information showing the command,
the first processor transmits the journal and the plurality of write data to the second processor, and
the second processor receives the journal and the plurality of write data and writes all of the plurality of write data to the plurality of storage areas in the second memory corresponding to the plurality of addresses designated by the command, on the basis of the journal and the second volume information.

7. The storage system according to claim 6, wherein
when it is determined that all of the plurality of write data are written to the first memory, the first processor registers information showing the number of the plurality of addresses in the journal,
when the journal and the plurality of write data are received, the second processor determines whether the number of the plurality of write data and the number of the plurality of addresses are matched, on the basis of the journal and the second volume information, and
when the number of the plurality of write data and the number of the plurality of addresses are matched, the second processor writes all of the plurality of write data to the plurality of storage areas in the second memory corresponding to the plurality of addresses designated by the command.

8. The storage system according to claim 2, further comprising:
a third storage device;
a third processor coupled to the server computer, the first processor, and the third storage device; and
a third memory coupled to the third processor, wherein
the third memory stores third volume information showing an association of the plurality of logical storage areas and a plurality of third device storage areas in the third storage device,
the third storage device stores a plurality of holding data in the plurality of third device storage areas, respectively,
the third memory stores the plurality of holding data,
the first processor transmits a plurality of write commands having designated the plurality of write data to the second processor, after the data reception process,
when the plurality of write data based on the plurality of write commands are written to the third memory, respectively, and the plurality of write data satisfies a predetermined condition, the third processor writes the plurality of write data in the third memory to the plurality of third device storage areas, respectively,
the first processor determines whether a non-transmitted write command to be transmitted to the third processor exists, and
when the non-transmitted write command does not exist, the first processor determines whether all of the plurality of write data are written to the first memory.

9. The storage system according to claim 2, wherein
the first memory stores the plurality of holding data in a plurality of first storage areas in the first memory,
the first memory stores first memory information showing an association of the plurality of logical storage areas and the plurality of first storage areas,
when the command is received, the first processor writes the plurality of write data to a plurality of second storage areas in the first memory different from the plurality of first storage areas, respectively,
the first processor determines whether all of the plurality of write data are written to the plurality of second storage areas,
when it is determined that all of the plurality of write data are written to the plurality of second storage areas, the first processor copies the plurality of write data in the plurality of second storage areas into the plurality of first storage areas, respectively, and transmits a first success response to the host computer, and
when the plurality of write data satisfies a predetermined condition, the first processor writes the plurality of write data in the plurality of first storage areas to the plurality of first device storage areas, respectively, on the basis of the first volume information and the first memory information.

10. The storage system according to claim 2, wherein
the first memory stores the plurality of holding data in a plurality of first storage areas in the first memory,
the first memory stores first memory information showing an association of the plurality of logical storage areas and the plurality of first storage areas, when the command is received, the first processor copies the plurality of holding data written to the plurality of first storage areas into a plurality of second storage areas in the first memory different from the plurality of first storage areas, the first processor receives the plurality of write data based on the command from the server computer and writes the plurality of write data to the plurality of first storage area, the first processor determines whether all of the plurality of write data are written to the plurality of first storage areas, when it is determined that all of the plurality of write data are written to the plurality of first storage areas, the first processor writes the plurality of write data in the plurality of first storage areas to the plurality of first device storage areas, respectively, on the basis of the first volume information and the first memory information, and when it is determined that at least a part of the plurality of data is not written to the plurality of first storage areas, the first processor copies the plurality of holding data in the plurality of second storage areas into the plurality of first storage areas, respectively.

11. The storage system according to claim 2, wherein the first memory stores the plurality of holding data in a plurality of first storage areas in the first memory, the first memory stores first memory information showing an association of the plurality of logical storage areas and the plurality of first storage areas, when the command is received, the first processor writes the plurality of write data to third storage areas in the first memory different from the first storage areas, the first processor determines whether all of the plurality of write data are written to the plurality of third storage areas, and when it is determined that all of the plurality of write data are written to the plurality of third storage areas, the first processor changes an association of the plurality of first device storage areas and the plurality of first storage areas in the first volume information and the first memory information to an association of the plurality of first device storage areas and the plurality of third storage areas and writes the plurality of write data in the plurality of third storage areas to the plurality of first device storage areas, respectively, on the basis of the changed first volume information and first memory information.

12. The storage system according to claim 2, wherein the first memory is a non-volatile semiconductor memory.

13. The storage system according to claim 5, wherein the first memory stores the plurality of holding data in a plurality of first storage areas in the first memory, the second memory stores the plurality of holding data in a plurality of fourth storage areas in the second memory, the first memory stores first memory information showing an association of the plurality of logical storage areas and the plurality of first storage areas, the second memory stores second memory information showing an association of the plurality of logical storage areas and the plurality of fourth storage areas, when the command is received, the first processor transfers the command to the second processor and writes the plurality of write data to second storage areas in the first memory different from the first storage areas, when the command is received, the second processor writes the plurality of write data to the plurality of fifth storage areas different from the plurality of fourth storage areas, when all of the plurality of write data are written to the plurality of fifth storage areas, the second processor transmits a second success response to the first processor, the first processor determines whether all of the plurality of write data are written to the plurality of second storage areas, when it is determined that all of the plurality of write data are stored in the plurality of second storage areas, the first processor copies the plurality of write data in the plurality of second storage areas into the plurality of first storage areas, respectively, when the plurality of write data satisfy a predetermined condition, the first processor writes the plurality of write data of the plurality of first storage areas to the plurality of first device storage areas, respectively, on the basis of the device association information and the first memory information, and when the notification is received and the plurality of write data satisfy the predetermined condition, the second processor writes the plurality of write data of the plurality of fifth storage areas to the plurality of second device storage areas, respectively, on the basis of the device association information and the first memory information.

14. A data write method executed by a storage system that has a first storage device, a first processor coupled to a server computer and the first storage device, and a first memory coupled to the first processor, wherein the first storage device stores a plurality of holding data in a plurality of first device storage areas in the first storage device, respectively, the first memory stores the plurality of holding data, the first memory stores first volume information showing an association of a plurality of logical storage areas in the first logical volume and a plurality of first device storage areas in the first storage device, the first processor provides the first logical volume to the server computer, on the basis of the first storage device, when the first processor receives a command to indicate designating a plurality of addresses showing the plurality of logical storage areas, respectively, and writing a plurality of write data to the plurality of logical storage areas, respectively, from the server computer, the first processor executes a data reception process for receiving the plurality of write data based on the command from the server computer and writing the plurality of write data to storage areas different from storage areas in which the plurality of holding data are stored in the first memory, the first processor determines whether all of the plurality of write data are written to the first memory, when it is determined that all of the plurality of write data are written to the first memory, the first processor transmits a first success response to the host computer and when the plurality of write data satisfy a predetermined condition, the first processor writes the plurality of write data in the first memory to the plurality of first device storage areas, respectively, and when it is determined that at least a part of the plurality of data is not written to the first memory, the first processor transmits a first failure response to the host computer.

* * * * *